(12) United States Patent
Poder et al.

(10) Patent No.: US 8,379,668 B2
(45) Date of Patent: Feb. 19, 2013

(54) CONTROLLING NETWORKED MEDIA CAPTURE DEVICES

(75) Inventors: James S. Poder, Cheltenham, PA (US); Michael J. Cook, Flemington, NJ (US)

(73) Assignee: Comcast Cable Communications, LLC, Philadelphia, PA (US)

(*) Notice: Subject to any disclaimer, the term of this patent is extended or adjusted under 35 U.S.C. 154(b) by 335 days.

(21) Appl. No.: 12/691,485

(22) Filed: Jan. 21, 2010

(65) Prior Publication Data

US 2011/0176555 A1 Jul. 21, 2011

(51) Int. Cl.
*H04J 3/16* (2006.01)
(52) U.S. Cl. .......................... 370/466; 370/353; 370/465
(58) Field of Classification Search .................. None
See application file for complete search history.

(56) References Cited

U.S. PATENT DOCUMENTS

| | | | |
|---|---|---|---|
| 6,751,221 B1 * | 6/2004 | Saito et al. | 370/392 |
| 7,152,110 B2 * | 12/2006 | Pierce | 709/227 |
| 7,339,907 B2 * | 3/2008 | Liscano et al. | 370/329 |
| 7,512,577 B2 * | 3/2009 | Slemmer et al. | 706/47 |
| 2007/0002867 A1 * | 1/2007 | Shitano et al. | 370/395.5 |
| 2007/0211728 A1 * | 9/2007 | Kim et al. | 370/395.5 |
| 2009/0252176 A1 * | 10/2009 | Morita et al. | 370/401 |
| 2009/0260042 A1 | 10/2009 | Chiang | |

FOREIGN PATENT DOCUMENTS

EP 1 990 956 A1 11/2008

OTHER PUBLICATIONS

Extended European Search Report in related European Patent Application No. 11151015.2, dated Apr. 12, 2011.

* cited by examiner

*Primary Examiner* — Donald Mills
(74) *Attorney, Agent, or Firm* — Banner & Witcoff, Ltd.

(57) ABSTRACT

Disclosed embodiments allow media players and other electronic devices that operate under a first protocol to control the media capture devices that operate with a second protocol which may not be configurable to communicate with the first protocol. In one embodiment of the disclosure, a network device may store and/or render content within a Digital Living Network Alliance (DLNA) network and/or assist in content delivery for a DLNA device on a network. In another embodiment of the disclosure, a media capture device uses the Internet Protocol.

20 Claims, 17 Drawing Sheets

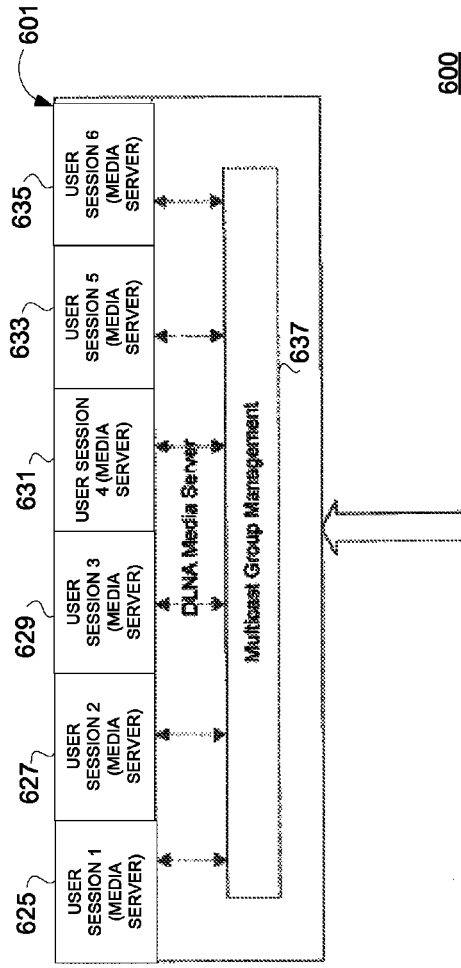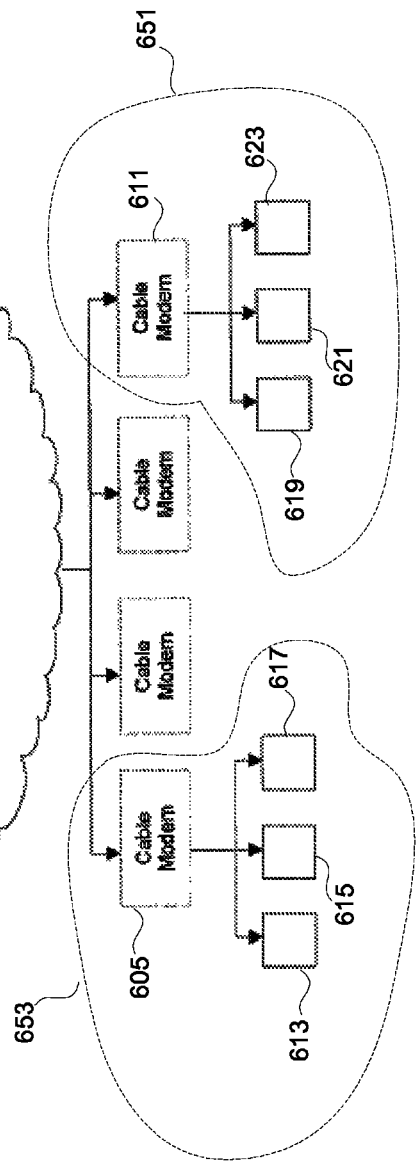
FIG. 6

CONTROLLING NETWORKED MEDIA CAPTURE DEVICES

TECHNICAL FIELD

Aspects relate to capturing and transmitting media content from media capture devices. More specifically, the media capture device may be located in a network and may implement protocols compliant with a Digital Living Network Alliance (DLNA).

BACKGROUND

Consumers are acquiring, managing and using digital media on multiple consumer electronic devices. Network media sources include a service provider's legacy video plant, the Internet, retail rental locations (e.g., physical DVDs), and the home network. A home network typically has consumer electronics (CE) devices such as set top boxes, DVD players, personal computers (PCs), game consoles, portable media devices, and mobile phones. Standards are evolving for content delivery, in which content portability may be achieved and made interoperable through the use of compatible devices and other video internetworking technologies. For example, the Digital Living Network Alliance (DLNA) is an international, cross-industry collaboration of consumer electronics, computing industry and mobile device companies. Members of DLNA develop a concept of wired and wireless interoperable networks where digital content such as photos, music, and videos can be shared through consumer electronics, PCs, and mobile devices in and beyond the home. The organization seeks to deliver an interoperability framework and design guidelines that become open industry standards. Current guidelines expand the capabilities of the DLNA-defined network to include more device classes and functional capabilities, including printers, mobile devices, controllers, uploaders and downloaders. The guidelines also include specifications for digital rights management.

While several devices, including media players, may communicate through a first protocol, such as DLNA, other devices, such as webcams often are not capable of being controlled through the first protocol. Moreover, traditional methods for controlling webcams and other media capture devices require consumers to install or initiate a specific interface to control the media capture device. For example, many webcams require a consumer to install a user interface on a computer device, such as a PC, which the consumer must load into memory to control the media capture device. Alternatively, the consumer may have to load a browser (such as an html browser) into memory, type in a specific IP address for the camera, and then manually control the camera. Often, these approaches require a separate computer device or browser to be implemented, require a device (such as a PC) to be powered with an application to be loaded in memory, and/or are not user friendly.

BRIEF SUMMARY

The following presents a simplified summary of the disclosure in order to provide a basic understanding of some aspects of the disclosure. It is not intended to identify key or critical elements of the embodiments or to delineate the scope of the embodiments. The following summary merely presents some concepts of the disclosure in a simplified form as a prelude to the more detailed description provided below.

Aspects of the disclosure allow media players and other electronic devices that operate under a first protocol to control the media capture devices that operate with a second protocol and may not be configurable to communicate with the first protocol. In one embodiment of the disclosure, a network device may store and/or render content within a Digital Living Network Alliance (DLNA) network and/or assist in content delivery for a DLNA device on a network. The network device may comprise a first interface configured to communicate with at least one media capture device that is controllable through a first protocol. In one embodiment, the first protocol may comprise elements of the Internet Protocol (IP). The media capture device may be a webcam that is operatively connected, either directly or indirectly, to the network device.

The network device may include a second interface configured to communicate with at least one media player through a second protocol. Alternatively, a single interface (i.e., either the first interface or the second interface) may be configured to communicate messages under the first and the second protocol, therefore negating the requirement for multiple interfaces. The media player may be a PC, gaming console, audio media player, TV, mobile device, or combinations thereof. In one embodiment, the second protocol comprises the DLNA protocol, including elements of the Universal Plug and Play (UPnP) protocol. The network device may include a computer-readable medium comprising computer-executable instructions that when executed by a processor perform one or more novel methods.

Further aspects of the disclosure are directed towards novel methods to control media capture devices. The methods may be performed by one or more processors executing computer-executable instructions on one or more computer-readable mediums. In certain embodiments, a network device executes the computer-executable instructions. The network device may be configured to detect a media capture devices through a first interface. The detection message may utilize elements of the Universal Plug and Play (UPnP) protocol and may be first transmitted by a DLNA media player. In one embodiment, the message comprises a Simple Service Discovery Protocol (SSDP) message which may be transmitted as a multicast message. In further embodiments, a message may be transmitted to a media player through a second interface of the network device that is indicative of the capture device's presence.

In certain embodiments of this disclosure, playback instructions may be received from the media player with a second protocol from the media player. The playback instructions, as natively transmitted from a user input device to the media player are configured to alter the playback of media on a network device. In one embodiment, the network device matches the playback instructions received from the media player with control signals of the first protocol configured to control the capture of media from the media capture device. The network device may receive captured media through the first interface from the media capture device. The captured media may be transcoded before being transmitted to the media player through the second interface. In certain embodiments, determining whether to transcode the captured media may comprise a process to determine the capabilities of the media player and/or a process to determine the presence of predefined rules.

In other embodiments, an indication of an action for controlling a media capture device may be displaying on a display device associated with a user input device that is configured to transmit a user input to the media player. In one embodiment, the display device may be located on the user input device. In another embodiment, the display device may be in operative communication with the media player.

Further aspects of the disclosure relate to using a plurality of media capture devices to monitor a location, such as through a security feature. In one embodiment, a determination whether to capture media from at least one media capture device is based upon, at least in part, the presence or alteration of an environmental condition. In one embodiment, an alteration of an environmental condition is detected by a media capture device operatively connected to the first interface of the network device. In further embodiments, playback instructions may be received from the media player to control signals of the capture device where the environmental condition was detected.

Other embodiments can be partially or wholly implemented on a computer-readable medium, for example, by storing computer-executable instructions or modules, or by utilizing computer-readable data structures. Of course, the methods and systems of the above-referenced embodiments may also include other additional elements, steps, computer-executable instructions, or computer-readable data structures. In this regard, other embodiments are disclosed and claimed herein as well.

The details of these and other embodiments are set forth in the accompanying drawings and the description below. Other features and advantages of the embodiments will be apparent from the description and drawings, and from the claims.

BRIEF DESCRIPTION OF THE DRAWINGS

The present disclosure is illustrated by way of example and not limited in the accompanying figures in which like reference numerals indicate similar elements and in which:

FIG. 6 shows multicast media group management for media content sharing in accordance with various aspects of the disclosure;

DETAILED DESCRIPTION

While traditional systems separately support set top boxes interacting with video-on-demand (VOD) controllers and computers interacting with IP-based video content servers (e.g., Fancast), system 100, as will be discussed, integrates the above two environments together. Consequently, VOD assets can be played on IP-based devices and IP-based content can be played on set top boxes.

Figure 1:
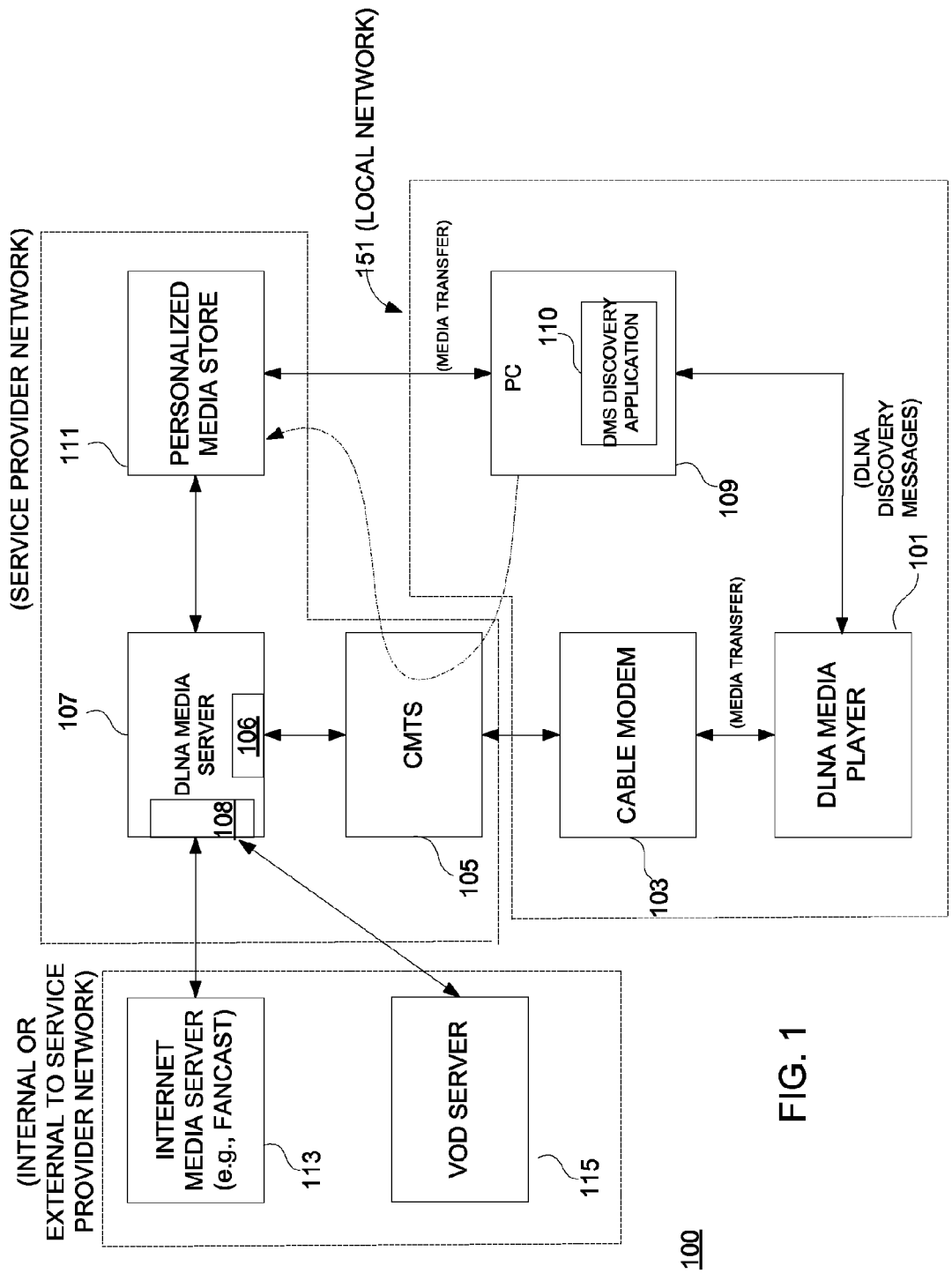
FIG. 1 illustrates a system with a media server that appears as a local media server in accordance with various aspects of the disclosure.

FIG. 1 shows a system 100 that supports a network such as a Digital Living Network Alliance (DLNA) network. DLNA published its first set of Interoperability Guidelines in June 2004 and the first set of DLNA Certified products began appearing in the market soon thereafter. DLNA Interoperability Guidelines, version 1.5, was published in March 2006, and then expanded in October 2006. These guidelines enlarge the capabilities of a DLNA-defined network to include more home and mobile devices. They also include the specifications for link protection to allow secure transmission of copyright-protected commercial digital content. Products are certified by passing the DLNA Certification Program. However, embodiments are not limited to version 1.5 of the DLNA Interoperability Guidelines.

DLNA media server 107 appears as a local media server in accordance with various aspects of the disclosure. While a DLNA media server is typically hosted at the customer (user) premises in accordance with traditional systems, DLNA media server 107 is hosted in the service provider network such as a cable network. Media server 107 may host all the personal media content for a user associated with the DLNA network, where media content may be uploaded directly from a device on the DLNA network by the user. Media server 107 may also connect to network media sources.

Figure 4:
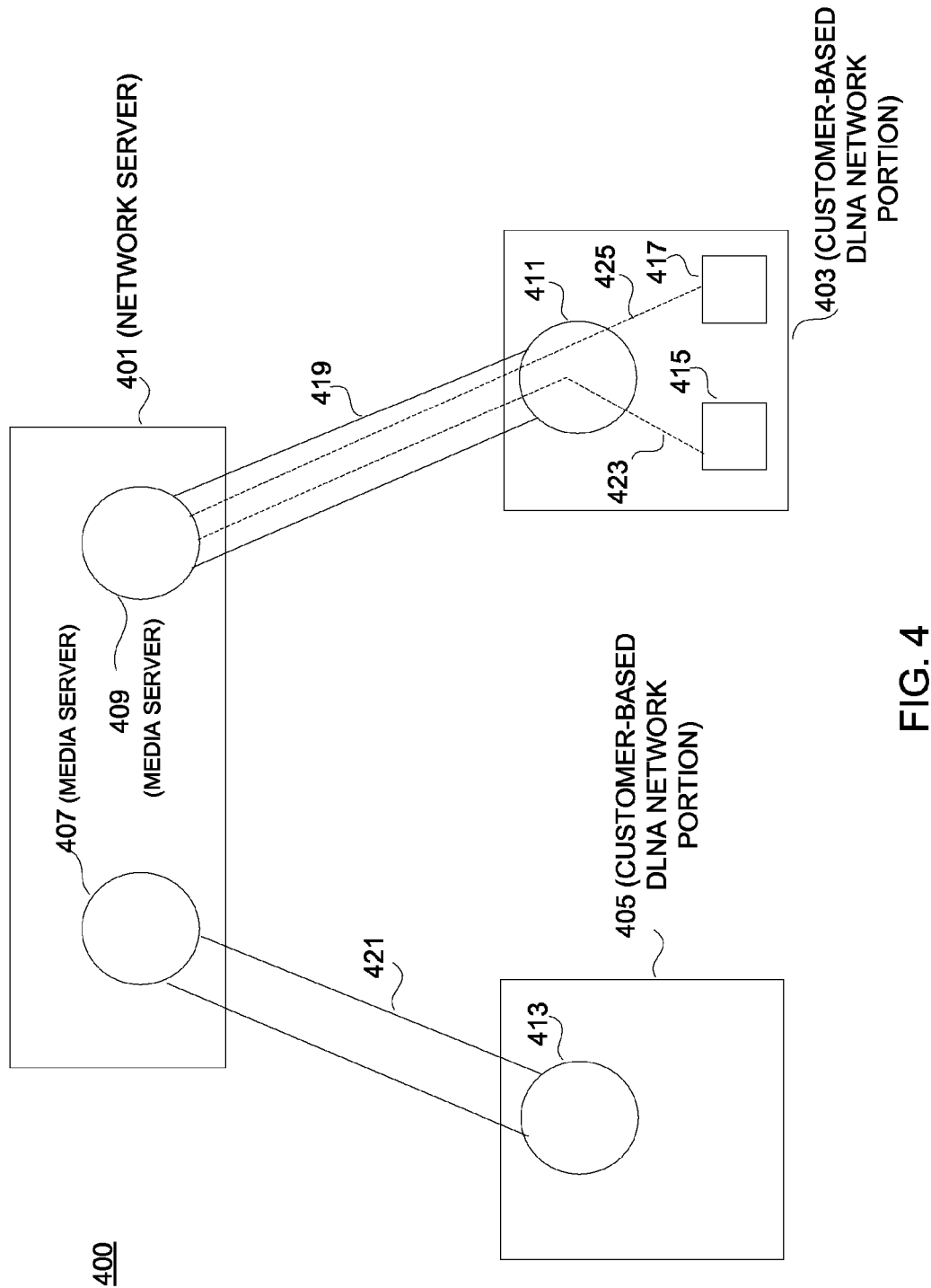
FIG. 4 shows a system with a network server supporting a plurality of DLNA networks in accordance with aspects of the disclosure.

As will be discussed, a hardware entity (e.g., network server 401 as shown in FIG. 4) typically supports a plurality of users in the service provider network, where each customer is associated with either a separate or virtual media server 107. Media server 107 may be referred to as a virtual media server because the media server appears to the devices on the user's physical LAN to be located in the user's private network, as will be discussed. Address mapping module 106 converts the physical address associated with media server 107 to a virtual address that is associated with a private network of the customer so that media server appears to be located within the private network (e.g., a DLNA network). For example, as will be discussed, a tunnel may be established between physical addresses while one or more sessions may be established within the tunnel using the virtual addresses.

With various aspects of the disclosure, a portion of the DLNA network is associated with the customer premises. The customer-based portion typically includes various DLNA devices, e.g., computer (PC) 109 and media player 101, as well as a local router (not explicitly shown in FIG. 1 but shown as router 307 in FIG. 3) that routes messages between the DLNA devices. With some embodiments, the local router may be where the tunnel between the physical device 106 and the local network 151 is terminated in the user's network With an embodiment, media server 107 is discovered through discovery application 110, which is typically implemented in the local network. Content fulfillment from the provider network and content delivery may occur through an existing infrastructure (e.g., termination system TS 105 and modem103).

TS 105 may be equipment typically found in a provider's head-end (not shown) or at a provider hub-site. In such embodiments, TS 105 typically provides high speed data services, e.g., cable internet or Voice over IP (VoIP), to subscribers. In order to provide these high speed data services, a provider often connects its head-end to the Internet via very high capacity data links to a network service provider. On the subscriber side of the network, TS 105 enables communication with subscribers' modems. Different TSs are typically capable of serving different modem population sizes ranging from 4,000 modems to 150,000 or more, depending in part on the amount of traffic.

A given head-end may be associated with a dozen or more TSs to service the modem population served by that head-end. The network could be a hybrid fiber coax (HFC) network, a fiber optic network, a wireless network, or another type of network. One example of a TS 105 may function as a router with Ethernet interfaces (connections) on one side and coax, RF, and/or fiber optic interfaces on the other side. The RF, coax, and/or fiber optic interfaces may carry RF signals to and from modem 103. TS 105 typically supports high-speed data interfaces as well as RF interfaces. Consequently, traffic that is coming from the Internet (e.g., from Internet media server 113) may be routed (or bridged) through an Ethernet interface, through TS 105, and then onto the RF interfaces to modem 103.

With network-based hosting of media server 107, media content between an IP network and a broadcast network may be shared as will be further discussed. With media server 107 hosted in the provider network, media server 107 may store the personal media content of the user at personalized media store 111. The media content may be stored directly by the user by accessing server 107 securely or by downloading the media content from an external IP source (e.g., a Fancast server, which can be accessed at www.fancast.com) to media server 107. For example, a service provider (e.g., Comcast-.net) may allow a personalized web page for each of its customers, and the media content may be uploaded and categorized to the web page.

Media server 107 provides media content for a private network that is separate from the media content for another private network. For example, as shown in FIG. 4, media content for media server 407 is separately stored from media content for media server 409, in which each media server is associated with different private networks. Consequently, media server 107 may be implemented as a disaggregated DLNA media server for supporting remote fulfillment, in which media content for a private network may be locally discovered. Discovery of media server 107 and announcing of content is typically implemented within the local network (e.g., discovery application 110). This approach may reduce the number of router hops and reduce the round trip delay time during the discovery process. With some embodiments, proper operation of DLNA-compatible devices may require that DLNA discovery messages be routed with a maximum of 3 router hops and a maximum of 7 msec round trip delay time. Also, multicast messages typically are not routed from media server 107 to the local network through TS 105 and modem 103. During the DLNA discovery process, local DMS application 110 publishes the URL of media server 107 as the URL for the media content.

Some embodiments may utilize Universal Plug and Play (UPnP) to allow DLNA devices to connect seamlessly and to implement a DLNA network in the home (data sharing, communications, and entertainment) or in a corporate environment.

UPnP networking is typically based on IP addressing. Each DLNA device has a Dynamic Host Configuration Protocol (DHCP) client and searches for a DHCP server when the device is first connected to the network. If no DHCP server is available (the network is unmanaged), the DLNA device assigns itself an address. If during the DHCP transaction, a DLNA device obtains a domain name through a DNS server or via DNS forwarding, the DLNA device may use that name in subsequent network operations; otherwise, the device should use its IP address.

Given an IP address, UPnP networking further supports a discovery process. When a DLNA device is added to the network, the UPnP discovery protocol allows a DLNA device to advertise its services to control points on the network. Similarly, when a control point is added to the network, the UPnP discovery protocol allows the control point to search for devices of interest on the network. The discovery utilizes discovery messaging that may contain a device's type, identifier, and a pointer to more detailed information.

A media player (e.g., DLNA media player 101) may use the media server's URL as the destination URL and may communicate with media server 107 for the media content. Media server 107 may provide connectivity to existing media store (e.g., personalized Comcast.net web page) or implement a media store (e.g., personalized media store 111).

Although not explicitly shown, messaging between devices in a DLNA network is typically routed through a local router.

Media server 107 may connect to Internet media server 113 (e.g., a Fancast server) using Internet Protocol for content rendering over IP connectivity to TS 105 to share media content with downstream media players (e.g., player 101 and PC 109). With some embodiments, media server107 may make requests of Internet media server 113 using standard web interface requests (e.g., appearing as a PC requesting content using SOAP/XML). Media server 107 then proxies the data for the player 101. Initially, media server 107 may request the catalog of content from Internet media server 113, and may present that over interface 106 using standard UPnP messages annunciating content. Media server 107 may also support additional functionality, including session management for modem 103, transcoding media content to an appropriate format (e.g., MPEG 2 or MPEG 4) as required by a DLNA media player, and digital rights management (DRM) for playing the content on a downstream player (e.g., Digital Transmission Content Protection over Internet Protocol (DTCP-IP)).

Media content downloading from Internet media server 113 may be supported by exporting an interface (e.g., from Fancast to the DLNA media server 107). An exemplary embodiment incorporates a web service API with Simple Object Access Protocol (XML protocol) (SOAP/XML) format to connect to the DLNA media server 107 from Internet media server 113. DLNA media server 107 may query Internet media server 113 for the media content and cache media content with an expiry timer.

With other embodiments, alternative options implement Remote Method Invocation (RMI) using a Common Object Request Broker Architecture (CORBA) on the Fancast server 113, SQL queries from media server 107 to a database associated with Internet media server 113, or screen scraping of a website that is associated with Internet media server 113.

Media content from Internet media server 113 through media server 107 may be supported with various real-time protocols including Real Time Streaming Protocol (RTSP). RTSP allows a user to remotely control a streaming media server with VCR-like commands and allows time-based access to files on media server 107.

Figure 3:
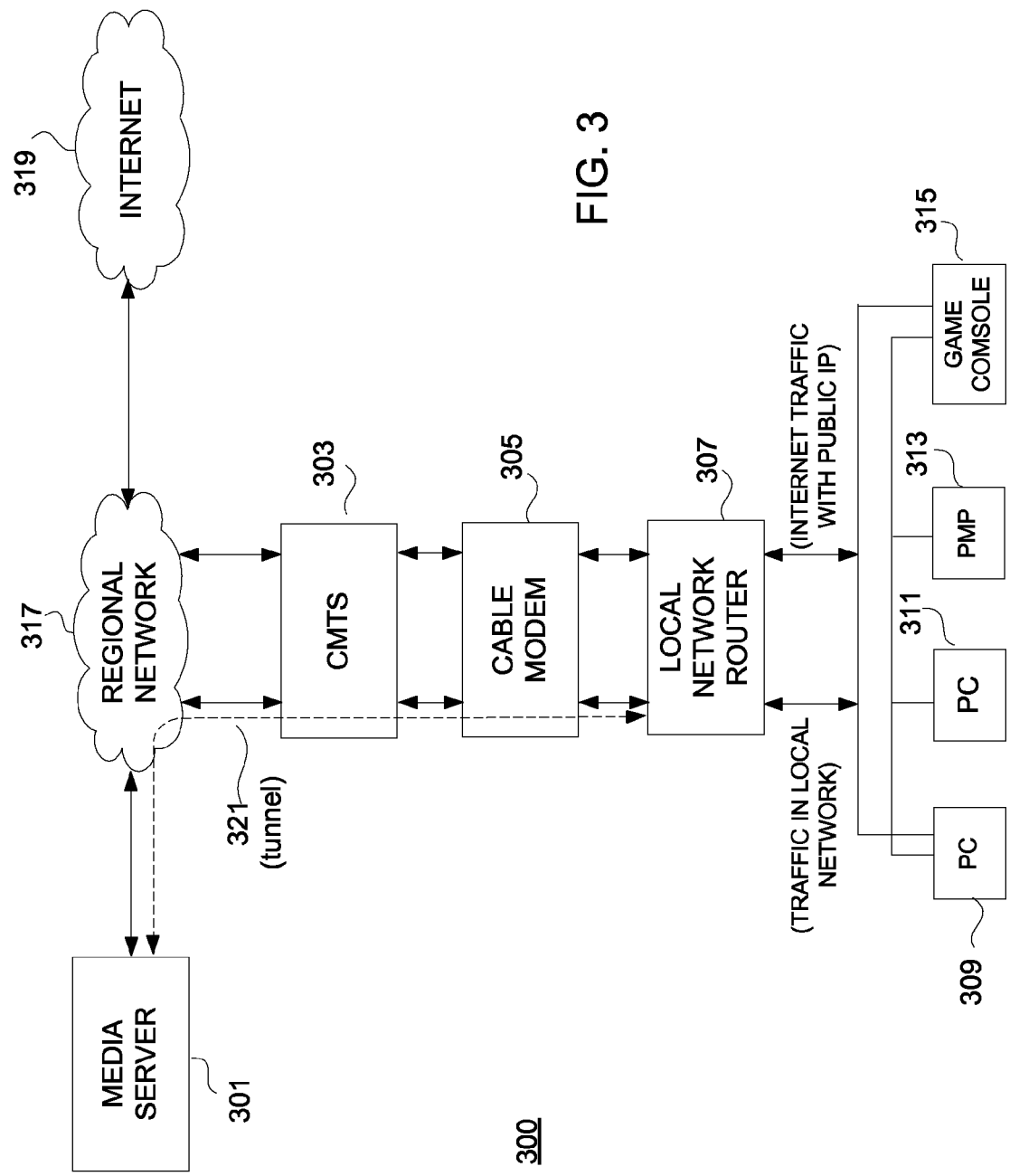
FIG. 3 shows a system in a network with tunneling flow in accordance with various aspects of the disclosure.

A communication channel (e.g., tunnel 321 as shown in FIG. 3) can be uniquely established from local (home) network 151 to DLNA media server 107. From the customer (end user) perspective, only one media server connects to Internet media server 113. Caching and data transfer may be maintained to provide the same user experience as that of directly connecting to Internet media server 113 or to media store 111.

System 100 may include a video on demand (VOD) server 115 to support an IP to VOD gateway application residing on a DLNA media server 107.

System 100 may be advantageous over traditional systems because additional DLNA media servers may not be needed at local network 151 (customer premises). For example, customers may buy devices with DLNA players built into them but may not have a DLNA server to access or content they wish to view in their home network. System 100 may a way for someone to have the service provider "do it for me" without having to purchase additional equipment or spend time building configuring. Personal media content is stored in the provider network media store, thus removing the need for a local storage in local network 151. Media content from Internet media server 113 and other personal media content may be directly downloaded to an IP-enabled DLNA media player because transcoding is performed by transcoder module 108 in the upstream network. Also, transcoder module 108 may perform transcoding so that IP media content may be delivered as a video on demand (VOD) through a set top box (not shown). Conversely, transcoder module 180 may perform transcoding so that a VOD media file (VOD asset) is delivered to an IP-compatible device.

Transcoder module 108 converts the format of a media file or streamed file format into an appropriate format so that a target device can properly play the converted media file based on characteristics of the target device (e.g., resolution and color display capability). Transcoder module 108 may convert video formats (i.e., MPEG-2 to MPEG-4, VHS to Quick-Time, QuickTime to MPEG). Also, transcoder module 108 may be used to fit HTML files and graphics files to the unique constraints of mobile devices and other Web-enabled products. Mobile devices often have smaller screen sizes, lower memory, and slower bandwidth rates. Transcoding may entail (changing file formats as previously discussed), transrating (lowering the screen resolution or frames per second to meet the capabilities of the player), and re-encrypting content. With some embodiments, requests made of the VOD server 115 may be of a proprietary protocol, but the Media Server 107 may know how to interface with that server and start and stream control content.

According to aspects of the disclosure, a media server (e.g., media server 107) may execute computer executable instructions from a computer-readable medium. Computer storage media may include volatile and nonvolatile, removable and non-removable media implemented in any method or technology for storage of information such as computer readable instructions, data structures, program modules or other data. Computer storage media include, but is not limited to, random access memory (RAM), read only memory (ROM), electronically erasable programmable read only memory (EEPROM), flash memory or other memory technology, CD-ROM, digital versatile disks (DVD) or other optical disk storage, magnetic cassettes, magnetic tape, magnetic disk storage or other magnetic storage devices, or any other medium that can be used to store the desired information and that can be accessed by a processor.

Figure 2:
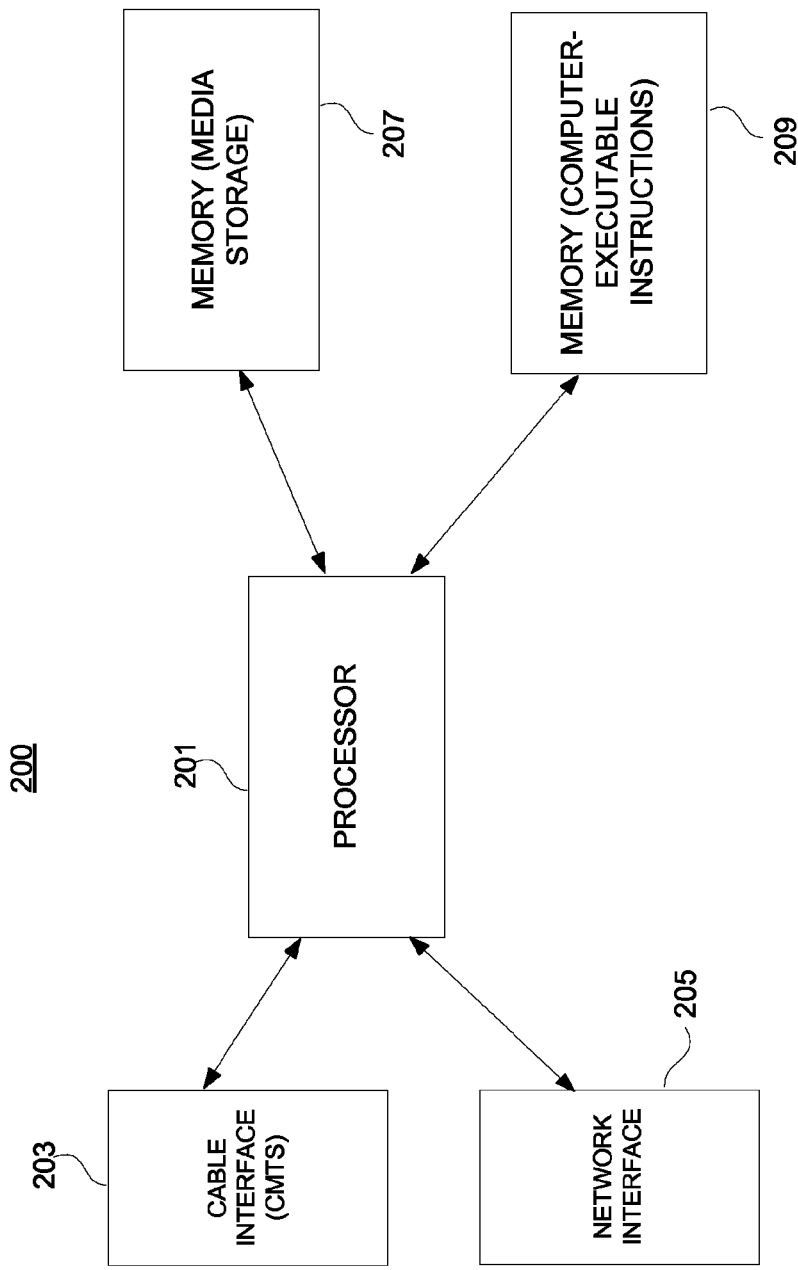
FIG. 2 shows an apparatus that supports a media server in accordance with various aspects of the disclosure.

FIG. 2 shows apparatus 200 that supports a media server in accordance with aspects of the disclosure. With some embodiments, apparatus 200 comprises a computer platform (e.g., network server 401 as shown in FIG. 4) that supports numerous media servers (e.g., media server 107), where each media server is associated with a corresponding private network.

Apparatus 200 interfaces to an external or internal network (shown including Internet media server 113 and VOD server 115 in FIG. 1) via network interface 205 typically with the Internet Protocol and cable interface 203 that communicates with supported private networks through TS 105.

Processor 201 provides functionalities associated with media server 107, as previously discussed, including transformation (e.g., transcoding) of media content and conversion of physical addresses to virtual addresses so that a virtual address appears to be local within a private network.

Processor 201 may execute computer executable instructions from a computer-readable medium, e.g., memory 209. Computer storage media may include volatile and nonvolatile, removable and non-removable media implemented in any method or technology for storage of information such as computer readable instructions, data structures, program modules or other data.

Apparatus 200 also includes memory 207 for storing media content. Even though personal media content may be stored in the service provider's network, the media content appears to be locally stored and discovered in the private network that is associated with the media server.

FIG. 3 shows system 300 in a network with tunneling flow in accordance with various aspects of the disclosure. System 300 hosts personalized server (media server) 301 in a service provider network (comprising local network router 307, modem 305, and TS 303) and connects the network with the user's local network (comprising PC 309, PC 311, portable media player (PMP) 313, and game console 315) by making the server IP address appear to be in the local network.

A communications channel may be established between media server 301 (which may be one of a plurality of media servers supported by apparatus 200) to a private network (e.g., local network 151 as shown in FIG. 1) through an Ethernet interface to TS 303. Consequently, TS 303 typically supports a coax RF connection to modem 305. With some embodiments, a L2TP communication tunnel may be established between media server 301 (or some sort of security endpoint in front of media server 301) and modem 305.

Media server 301 may be hosted in the upstream network 317 and connects with the corresponding user's local network. In a cable network, modem 305 is typically at the customer premises and provides the public IP for the local network. The local network is typically a private network with private IP addresses, which are not routable outside of the network.

With traditional systems, other IP enabled devices in the local network cannot communicate with any personalized servers (e.g., server 301) in the network cloud. The private IP addresses of devices 309, 311, 313, and 315 are routable within the private network only and routed to external networks via the modem's public IP address and by performing network address translation. Personalized services (e.g., storage of the media, the DLNA Media server capability, and so forth) with traditional systems are controlled and maintained by the user in the local network. Because personalized services are typically available only through the public Internet, it may be difficult to offer services which require processing of multicast messages for a DLNA network. Traditional cable networks typically do not route the multicast messages originated from a private network.

A network connection from local network devices to server 301 is supported so as to render various personalized services to the user. As will be further discussed, media server 301 appears to devices 309, 311, 313, and 315 to be in the local network by mapping physical addresses to virtual addresses. For example, server 301 may be assigned a physical IP address (e.g., 180.180.180.180) while the associated virtual address is within the virtual address space of the DLNA network. For example, media server 301 may have a physical IP address of 180.180.180.180 while the corresponding virtual address is 150.150.150.150, which is within the virtual address space of the DLNA network. The virtual address of media server 301 may be within an address range associated with modem 305. Continuing the example, the virtual addresses of devices 309, 311, 313, and 315 are 150.150.150.151, 150.150.150.152, 150.150.150.153, and 150.150.150.154, respectively. Devices 309, 311, 313, and 315 and server 301 can communicate with each other using the virtual addresses so that media server 301 appears to be local within the DLNA network.

The translation of physical to virtual addresses can be performed by processor 201, in which tunnel 321 is established between media server 301 and either modem 305 or local network router 307, which corresponds to an endpoint in local network 151 (as shown in FIG. 1). Embodiments can support different endpoints in a private network, including modem 305, local network router 307, or PC 309. Once tunnel 321 has been established, a session may be established where media server 301 is associated with a virtual address that is within the address space of modem 305.

In order to decrease delay times and to reduce the number of router hops, tunnel 321 is established between an endpoint in the DLNA network (e.g., local network router 307) and media server 301. Embodiments may establish a tunnel to different endpoints, including network PC 311 or modem 303, by using the physical addresses. Once tunnel 321 has been established, one or more sessions may be established within tunnel 321 using virtual addresses as will be further discussed. With some embodiments, establishing the tunnel is performed by using the L2TP protocol. The virtual address of the media server 301 is requested of the local router 307 after the L2TP tunnel is established.

FIG. 4 shows a system 400 with network server 401 supporting DLNA networks 403 and 405 in accordance with aspects of the disclosure. Network server 401 may be implemented as a server platform supporting numerous media servers (e.g., media servers 407 and 409), where each media server corresponds to a private network (e.g., a DLNA network). In order to extend the DLNA network to a media server, each DLNA network establishes a tunnel to the corresponding media server, where tunnel 419 corresponds to endpoint 411 and media server 409 and tunnel 421 corresponds to endpoint 413 and media server 407.

Once a tunnel has been established, one or more sessions may be established between a DLNA device and the corresponding media server using virtual addresses. For example, sessions 423 and 425 are established for devices 415 and 417, respectively, with media server 409.

Embodiments may use different protocols in order to establish tunnel 419. For example, embodiments may use Layer 2 Tunneling Protocol (L2TP). L2TP is a tunneling protocol used to support virtual private networks (VPNs) but does not provide encryption or confidentiality by itself. However, L2TP typically relies on an encryption protocol that it passes within tunnel 419 to provide privacy. Although L2TP acts like a data link layer 2 protocol (corresponding to the OSI model), L2TP is really a session layer 5 protocol. The entire L2TP packet, including payload and L2TP header, is sent within a UDP datagram. L2TP can support Point-to-Point Protocol (PPP) sessions (e.g., sessions 423 and 425) within L2TP tunnel 419.

IPsec can be used to secure L2TP packets by providing confidentiality, authentication, and integrity. The combination of these two protocols is generally known as L2TP/IPsec and is standardized in IETF RFC 3193. When the tunneling process is completed, L2TP packets between the endpoints are encapsulated by IPsec. Since the L2TP packet itself is wrapped and hidden within the IPsec packet, no information about the internal private network can be obtained from the encrypted packet.

L2TP with IPSec may be used to make a VPN connection between a local network device (e.g., device 415 or 417) and media server 409 that resides in media server 401. Media server 409 may be hosted in the regional network and may be routable from TS 303 (as shown in FIG. 3). Media server 409 assists in routing regional traffic (e.g., VOD or Fancast video) to the local network 403, thus providing a personalized network-based server to each household.

The two endpoints of an L2TP tunnel (corresponding to 409 and 411) are called the LAC (L2TP Access Concentrator) and the LNS (L2TP Network Server). The LAC is the initiator of the tunnel, while the LNS is the server, which waits for new tunnels. Once a tunnel is established, the network traffic (e.g., sessions 423 and 425) between the peers is bidirectional. Either the LAC or LNS may initiate sessions 423 and 425. L2TP tunnel 419 may extend across an entire PPP session or only across one segment of a two-segment session.

Media servers 407 and 409 support a personalized server part of the local network, but are hosted in the provider network cloud, thus providing personalized services to the user. Once the tunnel is created, the local network traffic may be routed to the upstream server. Network server 401, which is located in the service provider's network, can establish a connection for each private network through a tunnel. Network server 401 connects to multiple households, but appears as one virtual server (e.g., media servers 407 and 409) for each of the private networks.

Embodiments may also utilize a secure shell (SSH) tunneling protocol to establish tunnel 419. An SSH tunnel is an encrypted tunnel created through an SSH protocol connection. SSH tunnels may be used to tunnel unencrypted traffic over a network through an encrypted channel. To create an SSH tunnel, an SSH client is configured to forward a specified local port to a port on the remote machine. Once the SSH tunnel has been established, the user can connect to the specified local port to access the network service.

Figure 5:
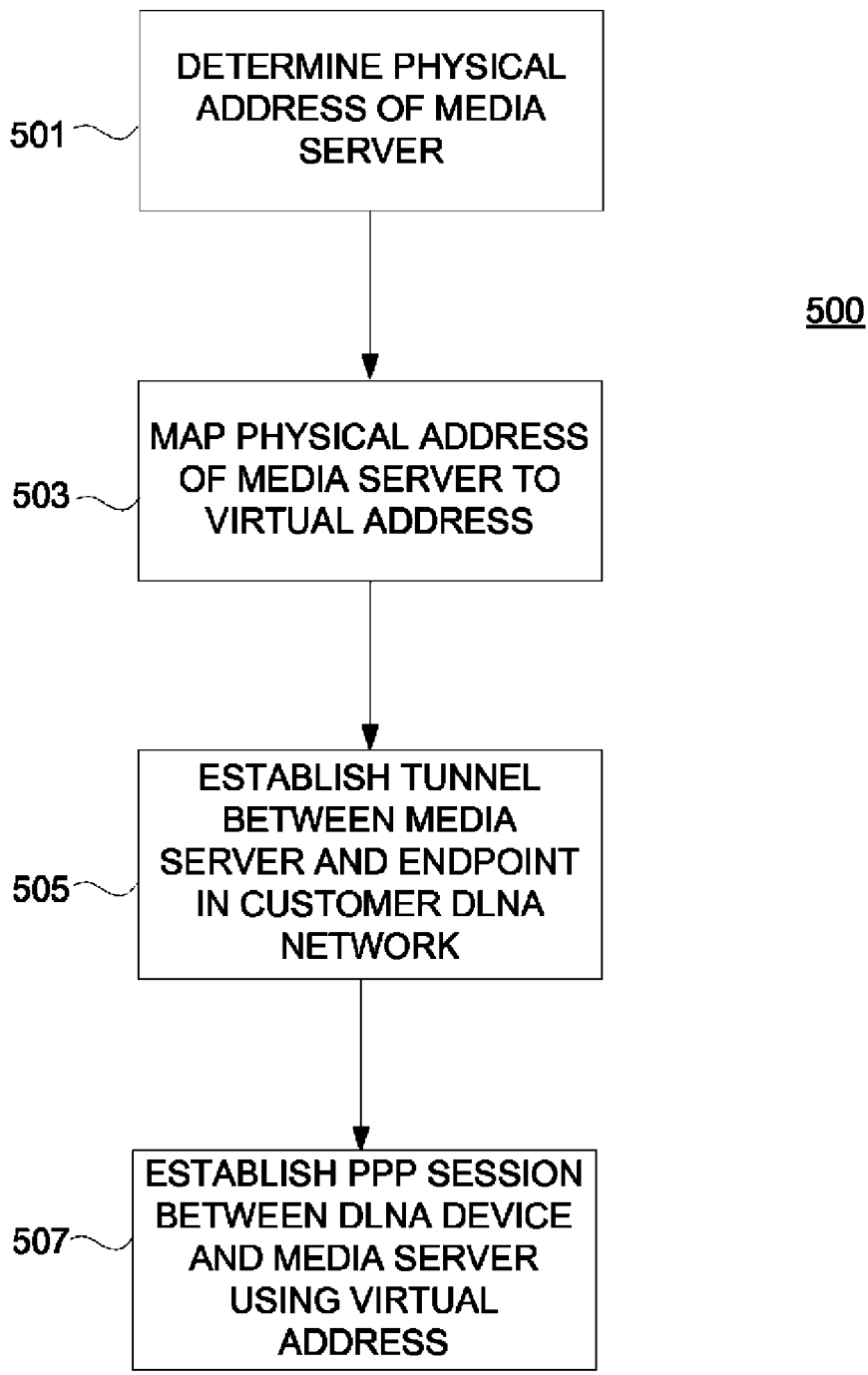
FIG. 5 shows a flow diagram that supports tunneling in accordance with aspects of the disclosure.

FIG. 5 shows a flow diagram 500 that supports tunneling in accordance with aspects of the disclosure. In step 501, the physical address of media server 409 is determined so that tunnel 419 can be established between endpoint 411 (e.g., modem 305, local network router 307, or PC 309 as shown in FIG. 3) and media server 409 in step 505. With some embodiments, tunnel 419 is established between arbitrary physical addresses, and then the virtual address is assigned from router 307 to media server 409 across the tunnel 419. In this way, it appears that media server 409 (from the perspective of the router and the player) is on the local network.

In step 503, the physical address of media server 409 is mapped to a virtual address so that the virtual address appears as a local address within DLNA network 403. The address mapping is performed by processor 201 (as shown in FIG. 2), which may be located in network server 401. With some embodiments, the mapping of local addresses is a function of L2TP, where all layer 2 traffic is carried across this link. The L2TP endpoint in the network may be common to all virtual sessions and may then assign a virtual server to the session. A tunnel is established in step 505 so that a session may be established to media server 409 from a DLNA device (e.g., 415 or 417). Consequently, media server 409 is treated as a local device within DLNA network 403 in step 507.

FIG. 6 shows a system 600 that supports multicast media group management for media content sharing in accordance with various aspects of the disclosure. Network-based media servers 625, 627, 629, 631, 633, and 635 that are implemented on server platform (network server) 601 share personalized media content for a multicast group using a network-based media server. Each user (corresponding to a media server (user session)) is able to store personalized media content. The media content may be shared with other users by making each user's media available through a multicast group. Moreover, users may subscribe to multiple media multicast groups. This approach consequently provides seamless content sharing across users through the network-based service.

A multicast group address can be used by sources and receivers to send and receive content. Sources use the multicast group address as the destination address in data packets. Receivers use the group address to inform the network that they are interested in receiving packets sent to that group. For example, if some content is associated with group address 239.1.1.1, the source sends data packets destined to 239.1.1.1. Receivers for that content inform the network that they are interested in receiving data packets sent to the group address 239.1.1.1. The receiver consequently "joins" group address 239.1.1.1. With some embodiments, it is up to the media server 107 to join a multicast group and send it down "unicast" to each DLNA client. Virtual IP address ranges may absolutely overlap. For example it is possible that all virtual addresses may be in the 192.168.0.x range.

System 600 connects DLNA networks 651 and 653 to an associated media server (625, 627, 629, 631, 633, or 635) through network 603, which comprises a service provider's infrastructure. DLNA network 651 comprises modem 611 and devices 619, 621, and 623 while DLNA network 653 comprises modem 605 and devices 613, 615, and 617. DLNA networks 651 and 653 may also include a local network router (not shown in FIG. 6).

With traditional systems, media content is shared by copying the media content to various portable devices such as DVDs, SD cards, and so forth. There may be a number of difficulties with conventional solutions. First, media content may be stored in the Internet and may not be secure enough. Also, playing media content on other media players (e.g., TVs and PMPs) typically requires more hardware or software support in the home because it requires a local DLNA media server in the home. Traditional approaches may also require that transcoding of media content to other formats be performed in the local network. Moreover, when using physical media for sharing, the media content typically needs to be copied to a physical storage device each time to share with each user. This may increase the cost to the user and may require supporting variety of physical storage devices.

With some embodiments, multicast group management function 637 shares personalized media stored in the provider's network with other users. Multicast group management function 637 may be performed by processor 201 as shown in FIG. 2. As previously discussed, tunneling with a DLNA network (e.g., DLNA network 651 or 653) enables a media server to appear as part of the DLNA network and enables media content from each user to be annunciated in a multicast group, which can be subscribed to by the other user. A user may join to or leave from the multicast group, in which a user may dynamically subscribe or unsubscribe to other user's media. The media owner can further restrict the sharing privileges by creating restrictions on the user's media group or by rejecting the restrictions to the multicast group (media group). For example, a web services layer may be supported where content can be shared. Sharing content with other users may involve creating virtual links inside the media server to share specific files or directories.

A media server of another other user interested in the media group may join or subscribe to the multicast group. Subscribing to the multicast group may be transparent to the user (e.g., the multicast group may be provisioned by the service provider) or may require explicit action by the user (e.g., through a DLNA device in response to multicast messaging advertising the multicast group). The subscribed user's media server may show media content that is shared by another user as aggregated media content to the user's media player in the downstream network.

A user may join or leave the multicast group (media group). The media owner may restrict the media to specific users by creating restrictions on the media group or by rejecting the subscriptions to the media group. This mechanism performs in a consistent manner to Internet Group Management Protocol (IGMP) for managing multicast groups. IGMP is a communications protocol often used to manage the membership of Internet Protocol multicast groups and may be used by IP hosts and adjacent multicast routers to establish multicast group memberships. IGMP is specified by documents (e.g., RFC 1112, RFC 2236, and RFC 3376) edited by the Internet Engineering Task Force (IETF).

Figure 7:
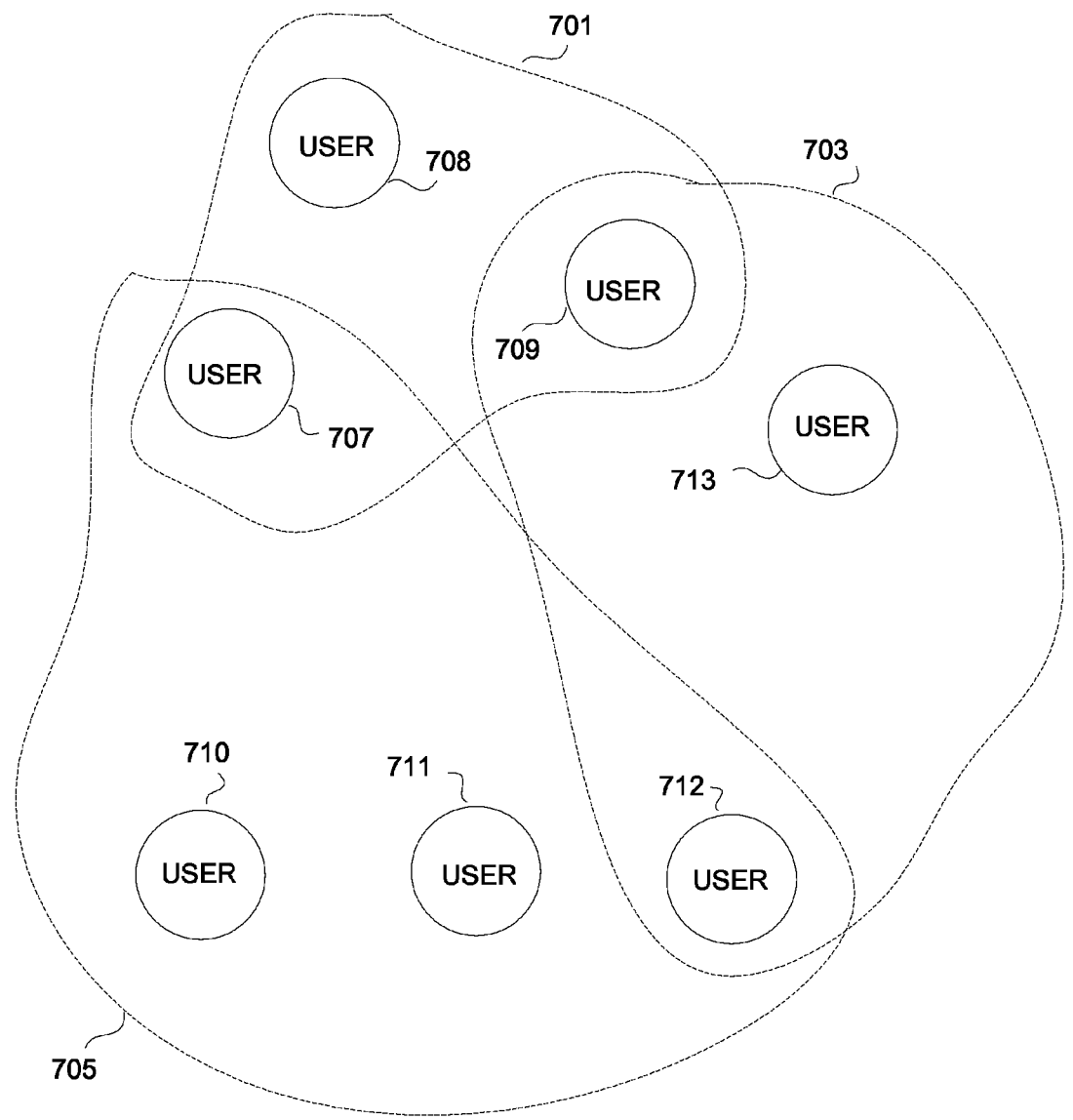
FIG. 7 shows an example of associating users with different multicast groups in accordance with various aspects of the disclosure.

FIG. 7 shows an example of associating users 707-713 with different multicast groups 701, 703, and 705 in accordance with various aspects of the disclosure. A user (corresponding to a media server) may be a member of one or more multicast groups. As exemplified by FIG. 7, user 707 is member of multicast groups 701 and 705, where each multicast group may have different restrictions. For example, multicast group 701 may include only family members while multicast group 705 may include friends. Consequently, user 707 may wish to share more personalized media (e.g., personal pictures) with members of multicast group 701 than with multicast group 705.

Figure 8:
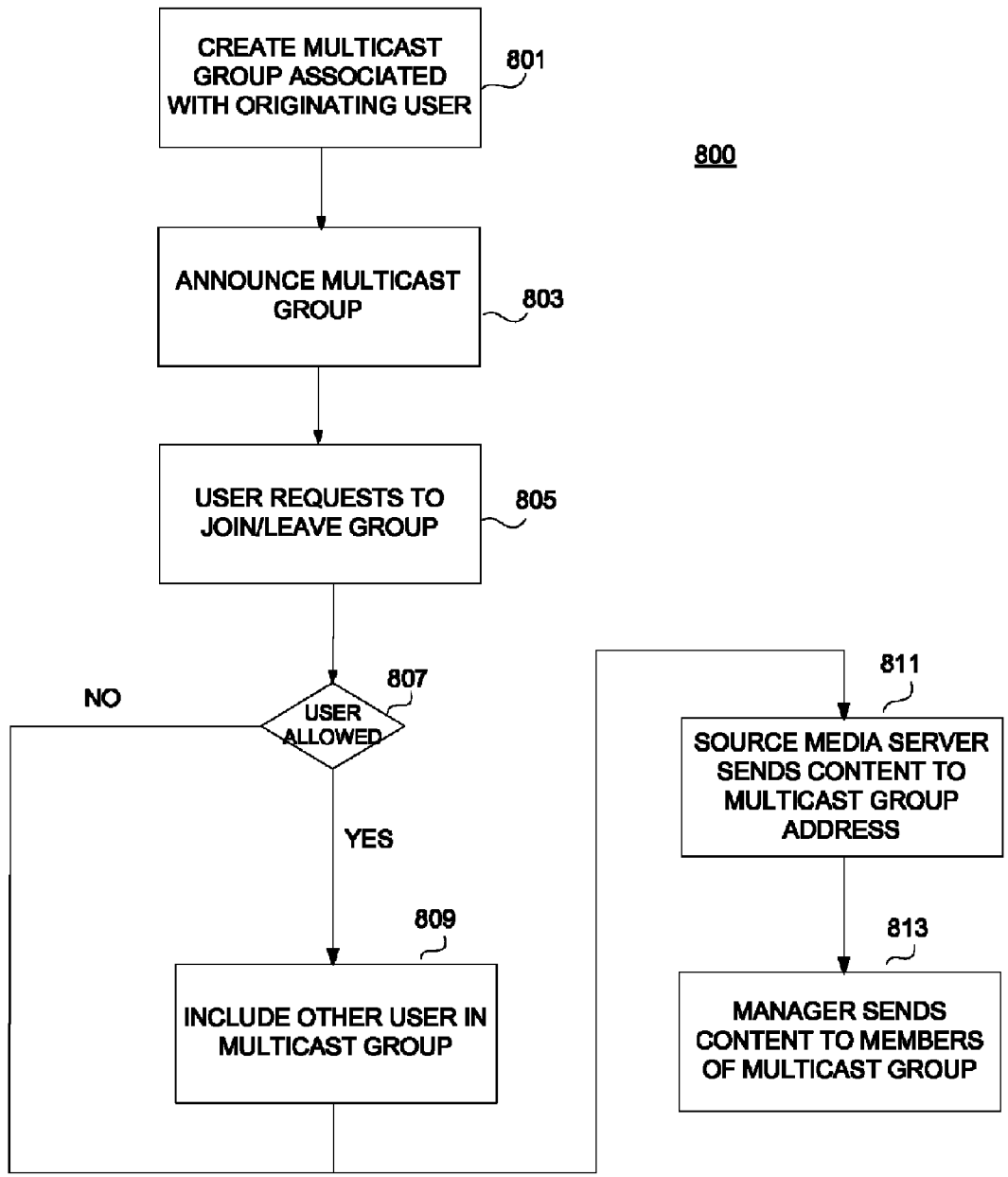
FIG. 8 shows a flow diagram for forming a multicast group in accordance with various aspects of the disclosure.

FIG. 8 shows a flow diagram 800 that supports sharing of media content using multicast groups in accordance with various aspects of the disclosure. In step 801, a multicast group is created based on one of the users supported on network server 601 (as shown in FIG. 6). Creation of the multicast group may be performed implicitly by a provisioning process or may be performed in an explicit manner, in which multicast messages are sent to selected DLNA networks so that users can discover available multicast groups and may request to join a multicast group.

In step 803, the multicast group is announced to different users so that a user can request to join the group in step 805. With some embodiments, the user may explicitly discover and request membership in the multicast group by receiving messages from multicast group management function 637. With other embodiments, multicast group management function 637 may directly manage multicast membership when all of the members are supported by media servers on network server 601 without direct participation by the users in the local networks.

In step 805, a user requests to join or leave the multicast group. Multicast group management function 637 may act on behalf of the users based on provisioning information. If the user is permitted to join the multicast group, as determined in step 807, the requesting user is added to the multicast group in step 809, and a message for the multicast group is sent to the user (e.g., the associated DLNA network if the user is explicitly involved) or to the associated media server (if multicast group management function 637 is handling multicasting on behalf of the user).

In step 811, one of the members (corresponding to the source media server) may share media content by sending the media content to the multicast group address. Consequently, in step 813 multicast group management function 637 sends the shared media content to the media servers that are associated with the multicast group.

A virtual address in a DLNA network may be converted into a multicast group address so that the multicast group appears to be local to the DLNA network by multicast group management function 637 based on provisioning of the multicast groups.

Figure 9:
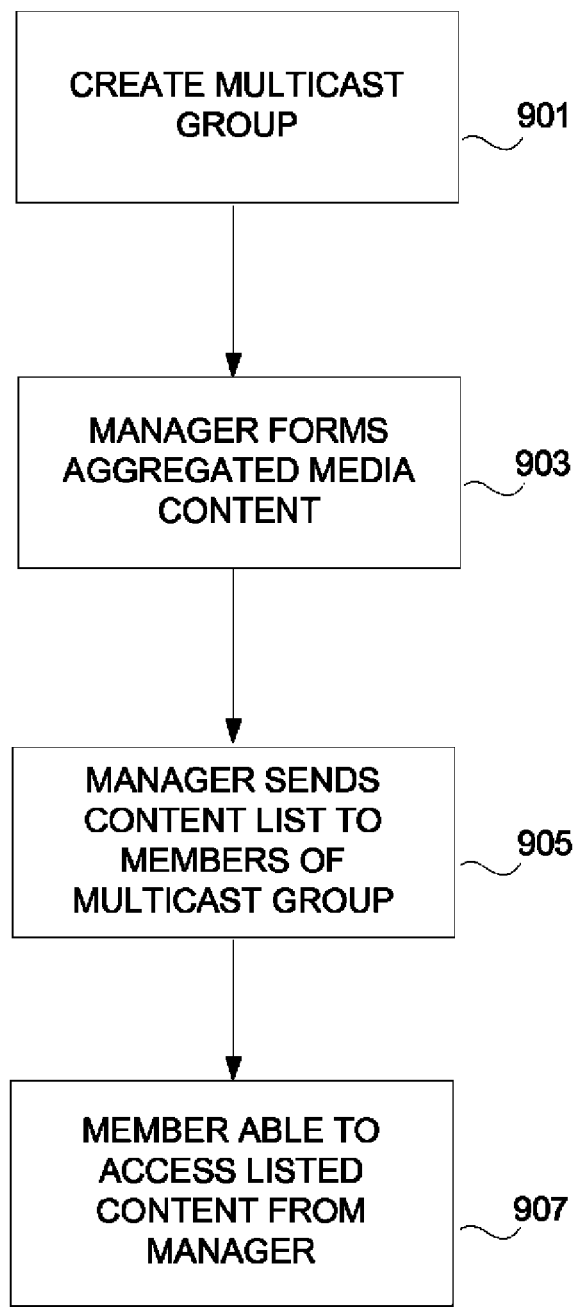
FIG. 9 shows a flow diagram that supports content messaging in accordance with various aspects of the disclosure.

FIG. 9 shows a flow diagram 900 that supports sharing of media content using multicast groups in accordance with various aspects of the disclosure. In step 901, a multicast group may be created (corresponding to steps 801, 803, 805, 807, and 809 as shown in FIG. 8). Flow diagram 900 is based on flow diagram 800 and further aggregates (combines) content media content that can be shared among the members of the multicast group. Based on media restrictions for the multicast group (e.g., from provisioning information for the multicast group), multicast group management function 637 forms the aggregated media content with shared media content for the multicast group in step 903. Media content may be aggregated based on characteristics of media content. For example, members of a multicast group may not wish to share family pictures with the other members. With some embodiments, a Web application may be supported that allows users to self-classify media and the permissions surrounding that media. Rather than duplicating media content, multicast group management 637 may use pointers that address corresponding media content for a plurality of users.

In step 905, multicast group management function 637 may send the content list of aggregated media content to the members of the multicast group. Subsequently, a member can select available media content from multicast group management function 637. With some embodiments, content annunciation happens through the multicast address, while the request and access of actual content happens through the virtual IP address and not through the multicast address.

With some embodiments, sharing of content may be accomplished through the use of one or more capabilities associated with the virtual machines in the network. Capabilities include:

Content to be shared is made available from one virtual machine to another via a copy or link of the asset to the virtual machine associated with the party to which the content is to be shared. In this case, the virtual server associated with the party with which the content is to be shared references a copy of the media directly or indirectly through a symbolic link.

The party with whom the media is to be shared should contact the sharing party's virtual server directly and request the content.

A third party server (e.g., a RADIUS server) should control access to each asset associated with any virtual machine in the network.

However, regardless of which implementation, there is typically a need for authentication and access control only to allow authorized parties to specific assets.

Figure 10:
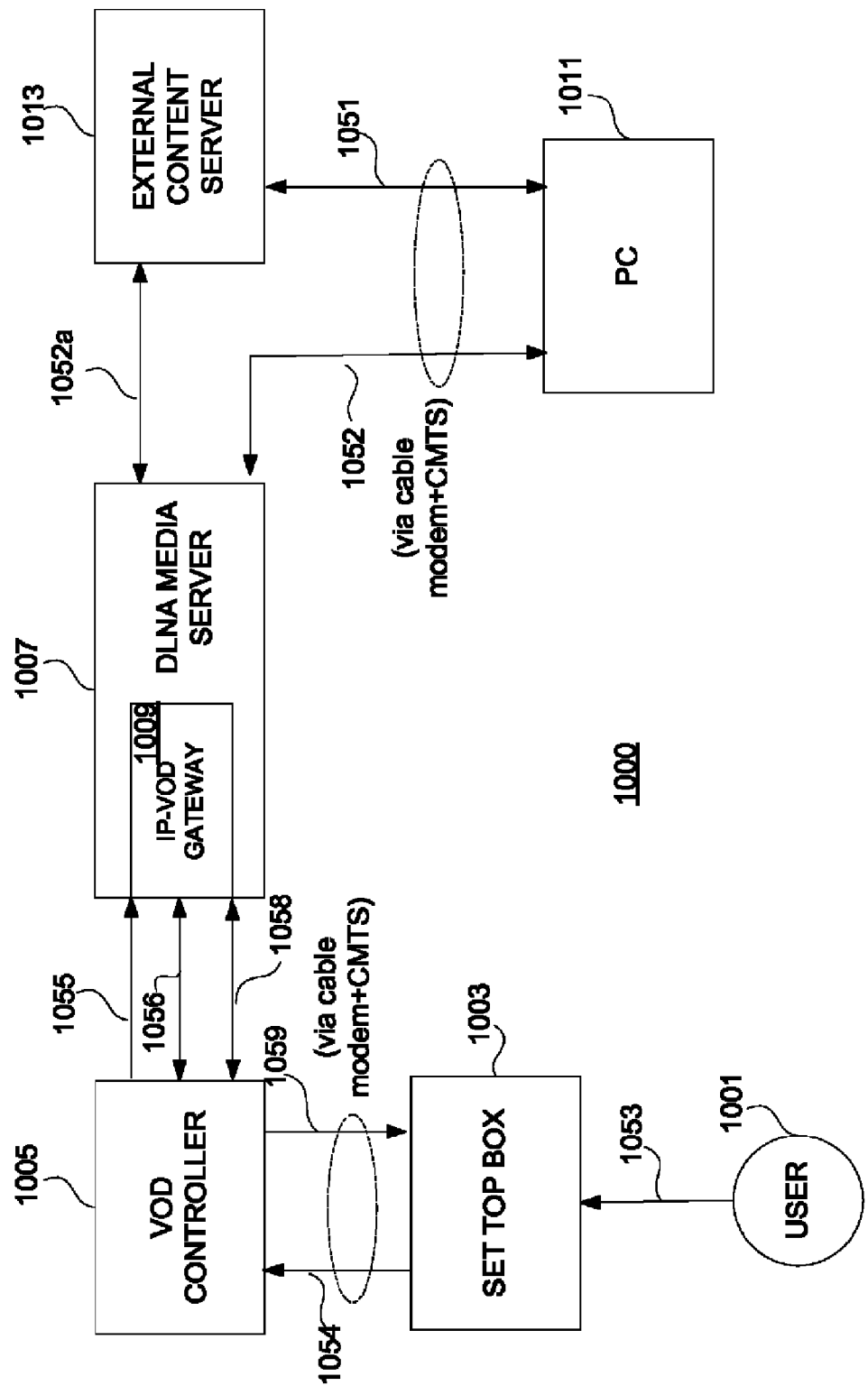
FIG. 10 illustrates an Internet Protocol (IP) to Video On Demand (VOD) gateway in accordance with various aspects of the disclosure.

FIG. 10 illustrates an Internet Protocol (IP) to Video VOD gateway in accordance with various aspects of the disclosure. System 1000 includes a VOD server (e.g., server 115 but not explicitly shown in FIG. 10) through VOD controller 1005 to support an IP to VOD gateway residing on a DLNA media server 1007. Media server 1007 may include a function to distribute media content to IP enabled media players (e.g., PC 1011) and to set top box 1003. Set top box 1003, may be a gateway or another device and/or part of the media player 1007.

In an exemplary embodiment, media content may be from any of the three sources from a service provider network: Internet media server 113, VOD server 115, or personalized media store 111 as shown in FIG. 1. With some embodiments, DLNA media server 1007 supports the following functionalities:

Session management of VOD controller 1005.
Authentication for each session.
Transcoding of media content.
Connectivity to Personalized Media Store (not explicitly shown in FIG. 10 but corresponding to 111 as shown in FIG. 1).
Connectivity to External Content Server 1013.
Aggregate and display VOD assets to an IP based media player 1011 (also shown as PC 1011).
Mapping DRM of VOD and IP assets.

IP-based content may be transcoded by DLNA media server 1007 to reformat the content for the correct display size with the correct frame rate for the end equipment displaying the VOD asset. In addition, DLNA media server 1007 handles transcription and digital rights management rules. DRM rules often apply to original content and that need to be mapped to reformatted content. For example, the rules that apply to Windows Media® digital rights management (DRM) should be mapped to the corresponding VOD asset so that a television understands the DRM rules when paying the VOD asset. In addition to digital rights management, DLNA media server 1007 may handle the business rules (e.g., rental, purchase, how many devices and which devices) and personal rules associated with profile management for the content. For example, content may be viewable only by authorized recipients.

System 1000 may utilize features of VOD controller 1005, including managing a session with network-based DLNA media server 1007 through IP-VOD gateway 1009, transferring the personalized media content from the DLNA media server 1007 to set top box 1003 on an in-band channel, rendering content media from DLNA media server 1007 as a VOD asset, and announcing the VOD assets to DLNA media server 1007 for selection by user 1001. As used herein, the term "set top box" is used to describe an apparatus that is configured to navigate, select, receive and provide an output of multimedia content from a provider such as a broadcast, unicast, multicast, and/or video on demand, Internet, private network, or other provider (hereinafter content provider). The content provider may include a cable system, satellite system, fiber optic system, telephone system, mobile car TV system, phone TV system, power system, or other system associated with providing content navigation, selection and distribution services to a user (including business) location. Moreover, a set top box is not required to be a separate apparatus, but rather would encompass a television and/or DVR configurable to receive the media content. Indeed, any device that is configurable to receive and provide an output signal comprising media content from a broadcast provider falls within the term set top box as used herein. The apparatus(es) that form the set top box may include one or more processors, ASICs, memories, user interfaces, and other features to facilitate the operation thereof. An apparatus may interact with other delivery or control platforms to navigate, select, and receive content. Content may include data, applications, broadcast media, on demand media, and combinations thereof.

The DLNA media server with IP to VOD gateway may offer advantages over traditional systems. For example, system 1000 may provide accessibility of media across domain boundaries so that user 1001 can host personal media content such as photos, videos in the service provider network and can watch the media content on a television or other media player. Consequently, a separate digital media server (DMS) may not be needed at the customer premise, thus facilitating management of the DLNA network by the user. In addition, transcoding of content media and mapping of DRM can be performed by media server 1007 at the network level, and consequently the user would not need the associated applications in an entity on the customer premise. A non-technical user also may be able to easily play the personalized media from an IP network to a television. It also may be possible to share personal media with other users or subscribe to another user's content (such as photos, videos) with appropriate permissions and DRM.

Figure 11:
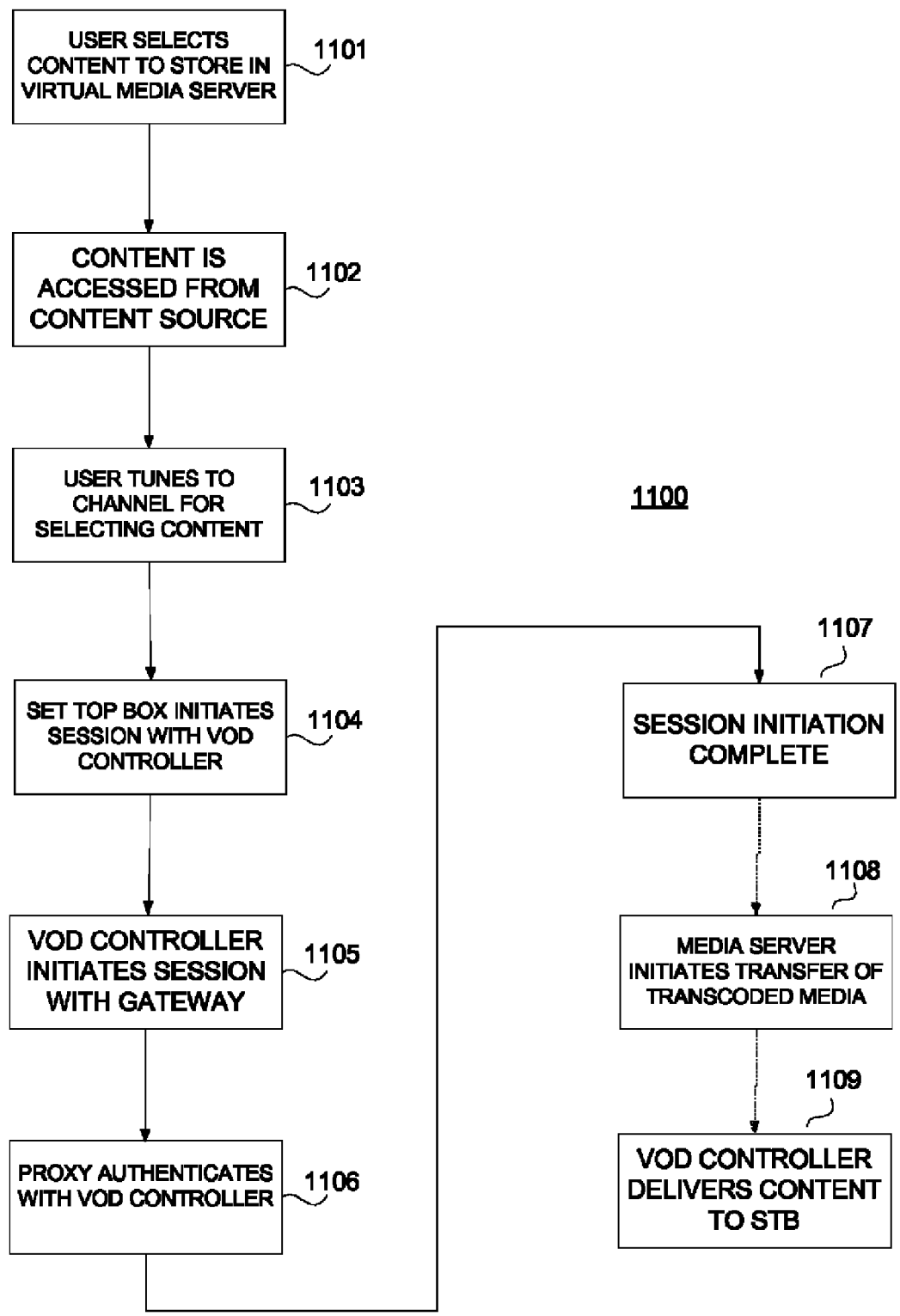
FIG. 11 shows a flow diagram for supporting IP to VOD gateway, as illustrated in FIG. 10, in accordance with various aspects of the disclosure.

FIG. 11 shows flow diagram 1100 for an exemplary method of supporting an IP to VOD gateway, as illustrated in FIG. 10, in accordance with various aspects of the disclosure. Flow diagram 1100 enables IP content media to be played on set top box 1003 as a VOD asset by delivering the media content from DLNA media server 1007 as a VOD asset to set top box 1003. User 1001 may instruct set top box 1003 to tune to a specific VOD channel, and VOD controller 1005 initiates a session with DLNA media server 1007 in order to stream the specific user's media content. Yet in other embodiments, upon selection of a specific media content, the set top box 1003 may automatically tune to a specific VOD channel, and VOD controller 1005 may then initiate a session with DLNA media server 1007 in order to stream the specific user's media content.

DLNA media server 1007 may perform transcoding (e.g., MPEG 2 format) in order to obtain a compatible format for set top box 1003. For example, a VOD asset typically has a MPEG-2 format while IP-based media content may have one of different formats including MPEG-2, MPEG-4, H.264, and H.263. Session management that is established between VOD controller 1005, and DLNA media server 1007 may use existing VOD protocols, e.g., Session Setup Protocol, Stream Control Protocol, and Autodiscovery. Referring FIG. 11, user 1001 chooses the media content to store in DLNA media server 1007 (virtual DLNA media server (DMS) in step 1101 corresponding to messaging 1051 as shown in FIG. 10. Consequently, in accordance with an exemplary embodiment, media content is stored in DLNA media server 1007 from user's PC 1011 in step 1102 (corresponding to messaging 1052). With another exemplary embodiment, subscribed media content from external content server 1013 (e.g., Fancast @fancast.com or YouTube @youtube.com) or aggregated media content from external content server 1013 may be stored on DLNA media server 1007 corresponding to messaging 1052a.

In step 1103 (corresponding to messaging 1053), user 1001 tunes set top box 1003 to a channel for selecting content stored in DLNA media server 1007. In step 1104 (corresponding to messaging 1054), set top box 1003 initiates a session with VOD controller 1005. Consequently, in step 1105 (corresponding to messaging 1055) VOD controller 1005 initiates a session with the gateway 1009 that may be executed on DLNA media server 1007.

In step 1106 (corresponding to messaging 1056), DLNA media server 1007 authenticates with VOD controller 1005 for initiating the user session. In step 1107 (corresponding to messaging 1057), the session initiation is completed In step 1108 (corresponding to messaging 1058), DLNA media server 1007 initiates transfer of the transcoded media content to set top box 1003. In step 1109 (corresponding to signal flow 1059), VOD controller 1005 uses the VOD infrastructure for delivering the media content to set top box 1003. Set top box 1003 consequently renders the media content to a connected player (not explicitly shown in FIG. 11).

Figure 12:
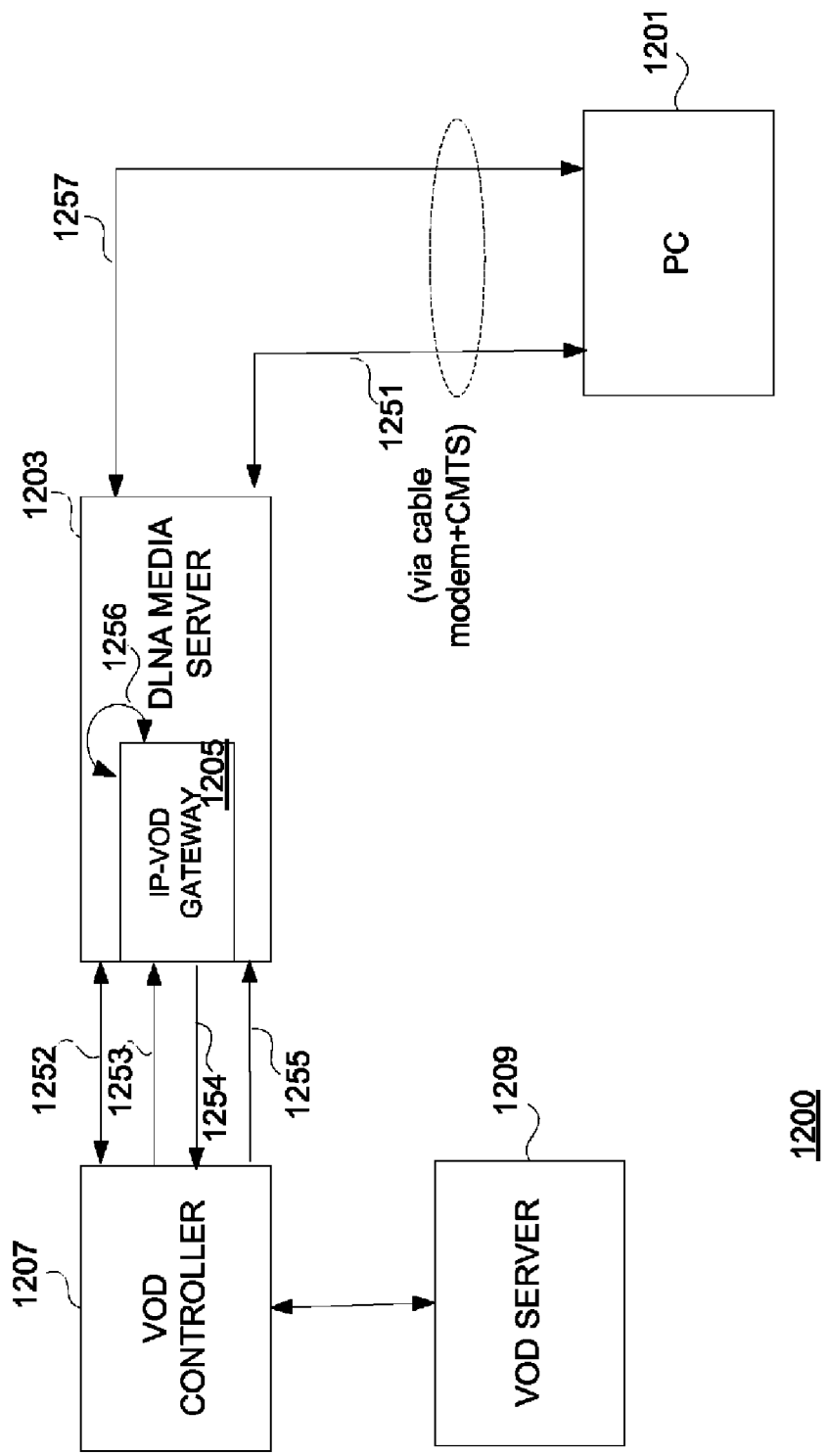
FIG. 12 shows a system in which a VOD asset is played on an IP-based media player in accordance with various aspects of the disclosure.

FIG. 12 shows system 1200 in which a VOD asset is played on an IP-based media player in accordance with various aspects of the disclosure. System 1200 is an inverse version of system 1000 as shown in FIG. 10. System 1000 enables IP-based media content to be played through set top box 1003 as a VOD asset, while system 1200 enables a VOD asset to be played on an IP-based media player (e.g., PC 1201).

DLNA media server proxy 1203 aggregates a VOD asset and provides a user interface to an application running on the media player 1201 (also shown as PC 1201 but may be a separate media player in some embodiments). The user selects a VOD asset using this application. IP-VOD gateway 1205 (which may be implemented on media server 1203) initiates a session with the VOD system and requests the VOD asset from VOD server 1209 through VOD controller 1207. DLNA media server 1203 transcodes the received media to the appropriate format for PC 1201, applies usage rules and DRM to the media content, and transfers the transcoded media content to PC 1201 downstream via the IP network.

Figure 13:
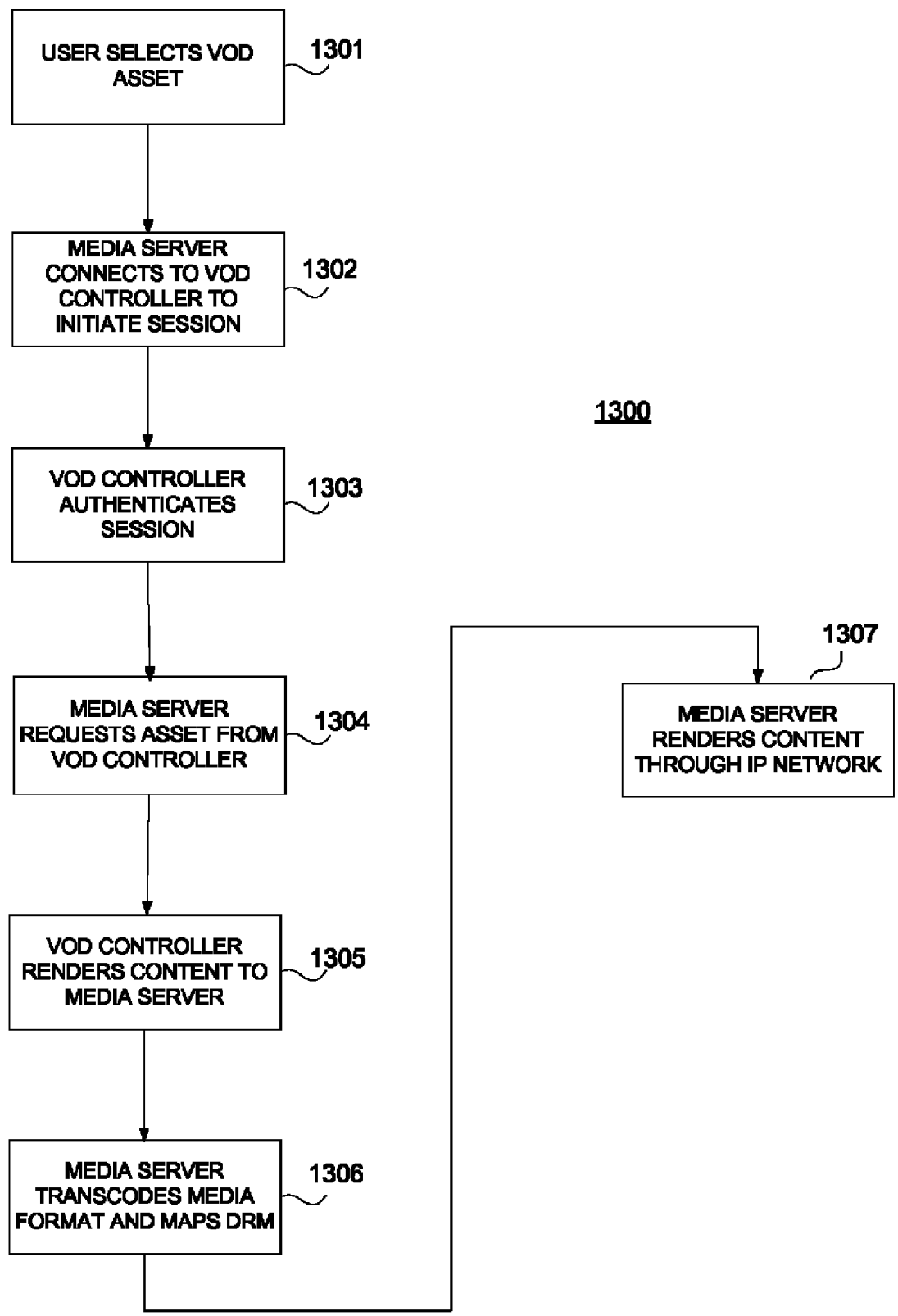
FIG. 13 shows a flow diagram for playing a VOD asset on an IP-based media player in accordance with various aspects of the disclosure.

FIG. 13 shows flow diagram 1300 for system 1200 in which a VOD asset is played on an IP-based media player 1201 in accordance with various aspects of the disclosure. In step 1301 (corresponding to flow 1251 as shown in FIG. 4) a user chooses a VOD asset from a list displayed on PC 1201 in the desktop application. Typically, the list is dynamically populated by DLNA media server 1203.

In step 1302 (corresponding to flow 1252) DLNA media server 1203 connects to VOD controller 1207 to initiate a session with the user credentials. In step 1303 (corresponding to flow 1253) VOD controller 1207 authenticates the session.

Once the session has been established in steps 1302 and 1303, DLNA media server 1203 requests the asset from VOD controller 1207 in step 1304 (corresponding to flow 1254). VOD controller 1207 consequently renders the requested media content to DLNA media server 1203 in step 1305 (corresponding to flow 1255).

In step 1306 (corresponding to flow 1256) DLNA media server 1203 transcodes the media format and maps the DRM of the requested VOD asset to the corresponding DRM (e.g., Windows Media DRM or Content Protection for Recordable Media and Pre-Recorded Media (CPRM/CPPM)). In step 1307 (corresponding to flow 1257) DLNA media server 1203 renders the transcoded media content through the IP network to PC 1201.

Figure 14:
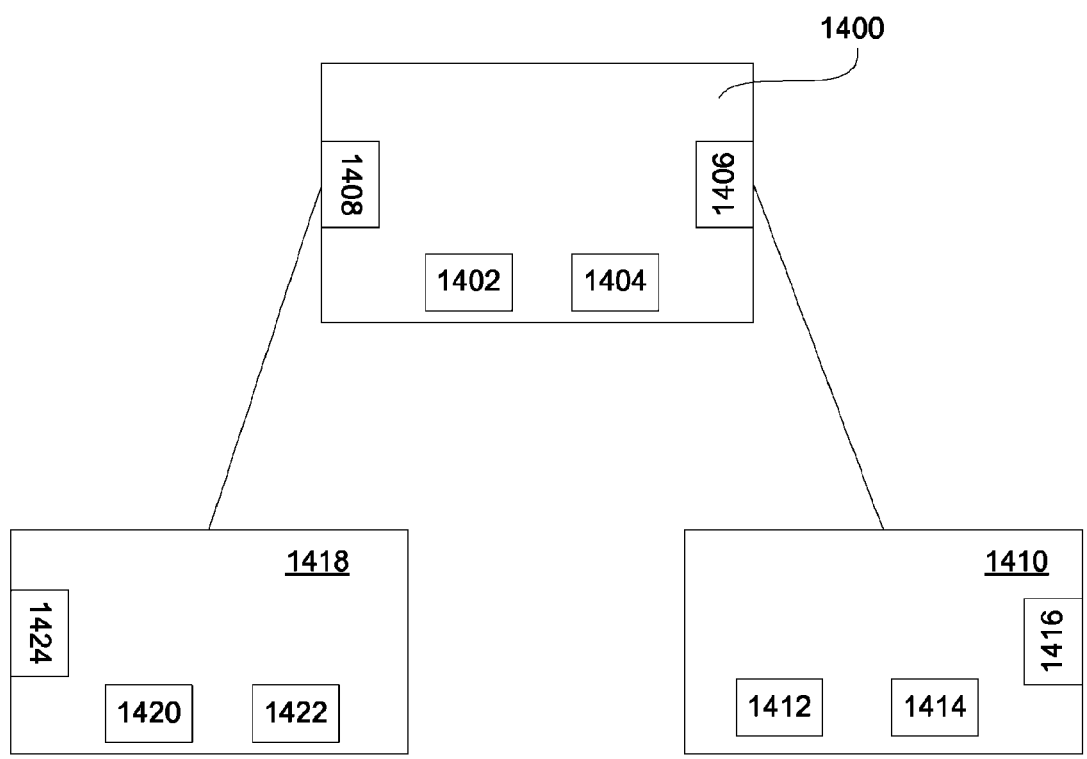
FIG. 14 shows an exemplary network environment device in accordance with various aspects of the disclosure.

Further aspects of the disclosure relate to configuring playback signals of a first protocol for controlling a media capture device under a second protocol. FIG. 14 shows exemplary network device 1400 which comprises a processor 1402 and a computer-readable medium 1404. The computer-readable medium 1404 may include volatile and nonvolatile, removable and non-removable media implemented in any method or technology for storage of information such as computer-readable instructions, data structures, program modules or other data as discussed above in relation to other embodiments.

In certain embodiments, network device 1400 is configurable to perform one or more functions as DLNA media server 107 (e.g., see FIG. 1). In some embodiments, network device 1400 may incorporate one or more elements or functions of router 307 shown in FIG. 3. Network device 1400 may be located within an IP-based network and configured to support a DLNA based media server (DMS). In yet other embodiments, network device 1400 may be remotely located from the customer's premises and be a virtual media server as discussed above. The network device 1400 comprises two interfaces 1406, 1408. Those skilled in the art will readily appreciate that the type and location of the interfaces will depend on several factors. In certain embodiments, the hardware implemented for the first and the second interfaces (1406, 1408) may vary, however, at least one interface is configurable to communicate with a first protocol and a second interface is configurable to communicate with a second protocol that is different than the first protocol. In other embodiments, one interface may allow the transmission/reception of electronic signals using the first protocol to a media capture device 1410 as well as the transmission of electronic signals using the second protocol to the media player 1418 (discussed in more detail below). Thus, as used in relation to the network device 1400, the first interface and the second interface may be two separate and distinct components or a single hardware component that may transmit and receive communications under the first and the second protocol.

Looking to FIG. 14, the first interface 1406 is configured to allow communication with at least one media capture device 1410 that is controllable through a first protocol. In certain embodiments, the media capture device 1410 may not be configured to utilize a second protocol, such as being able to receive and/or transmit control signals using the second protocol—which may be used by a media player on the same network. As used herein, a "media capture device" includes any device that may capture new media, as opposed to merely permit playback of previously stored media. The media may include for example, audio, video, and combinations thereof. Moreover, the term "controllable" as used in reference to a "media capture device" refers to the capability of the media capture device 1410 to receive electronic signals configured to capture media, including controlling and/or altering the media captured (i.e. zoom in a webcam). The media capture device 1410 may have a processor 1412 and a computer-readable medium 1414. Moreover, the media capture device 1410 may comprise interface 1416 for receiving and/or transmitting electronic signals with additional electronic devices in addition to network device 1400. Interface 1416 may be configured to communicate with other network devices through a third protocol that is different than the first and the second protocol. As discussed in more detail below, interface 1416 may be used for communications with a user input device.

It is within the scope of several embodiments to capture "unscheduled" media. In this regard, unlike set-top boxes or other media devices that may receive scheduled programming, certain embodiments disclosed herein are directed towards capturing of unscheduled media. For example, certain embodiments are directed towards the reception of non-static media, therefore, unlike merely receiving predefined media, such as a broadcasted television show, aspects of the disclosure allow the control of the media capture device 1410, such as the receipt of electronic signals for capturing media at specific time periods and may alter what is captured, such as by zooming in/out and or panning a capture device. For example, the media capture device 1410 may be a video camera, such as a webcam.

Using a webcam as the exemplary media capture device 1410, illustrative control signals may include record, zoom (in/out), directional inputs (up, down, left, right), among others. Thus, the first interface 1406 of the network device 1400 may communicate with the webcam through a first protocol. For example, several models of webcams currently utilize Internet Protocol (IP), therefore, in one embodiment, the first interface 1406 is configured to allow communication, including control signals, using IP.

The network device 1400 further comprises second interface 1408 configured to communicate with at least one media player, such media player 1418 through a second protocol (as discussed above, a single interface may be used instead of interfaces 1406 and 1408). Media player 1418 may be any electronic device configurable to initiate the playback (i.e. play, rewind, fast forward) of media. Indeed, media player 1418 may be any electronic device configurable to play media, including a PC, a laptop, handheld, mobile device or net-book). In one embodiment, the media player 1418 is a DLNA-capable media player. Media player 1418 may comprise a processor 1420 and a computer-readable medium 1422. In one embodiment, the computer-readable medium 1422 may be used for storing media, such as media captured with media capture device 1410. Computer-readable medium 1422 may have computer-executable instructions for controlling one or more playback features. In one embodiment, computer-executable instructions may perform processes that assist in the buffering and/or transferring of media to the media player 1418. Media player 1418 may further comprise interface 1424 configured to receive and/or transmit electronic signals with additional electronic devices in addition to network device 1400. In one embodiment, interface 1424 may be configured to communicate with a remote control to allow a user to control one or more playback features of the media player 1420. In one embodiment, a remote control may comprise a game controller that allows a user to utilize media player 1420 as a gaming console. In one embodiment, computer readable-medium 1422 comprises one or more games that may be executed in connection with or independently of any media received from interface 1408 from network device 1400.

Figure 15:
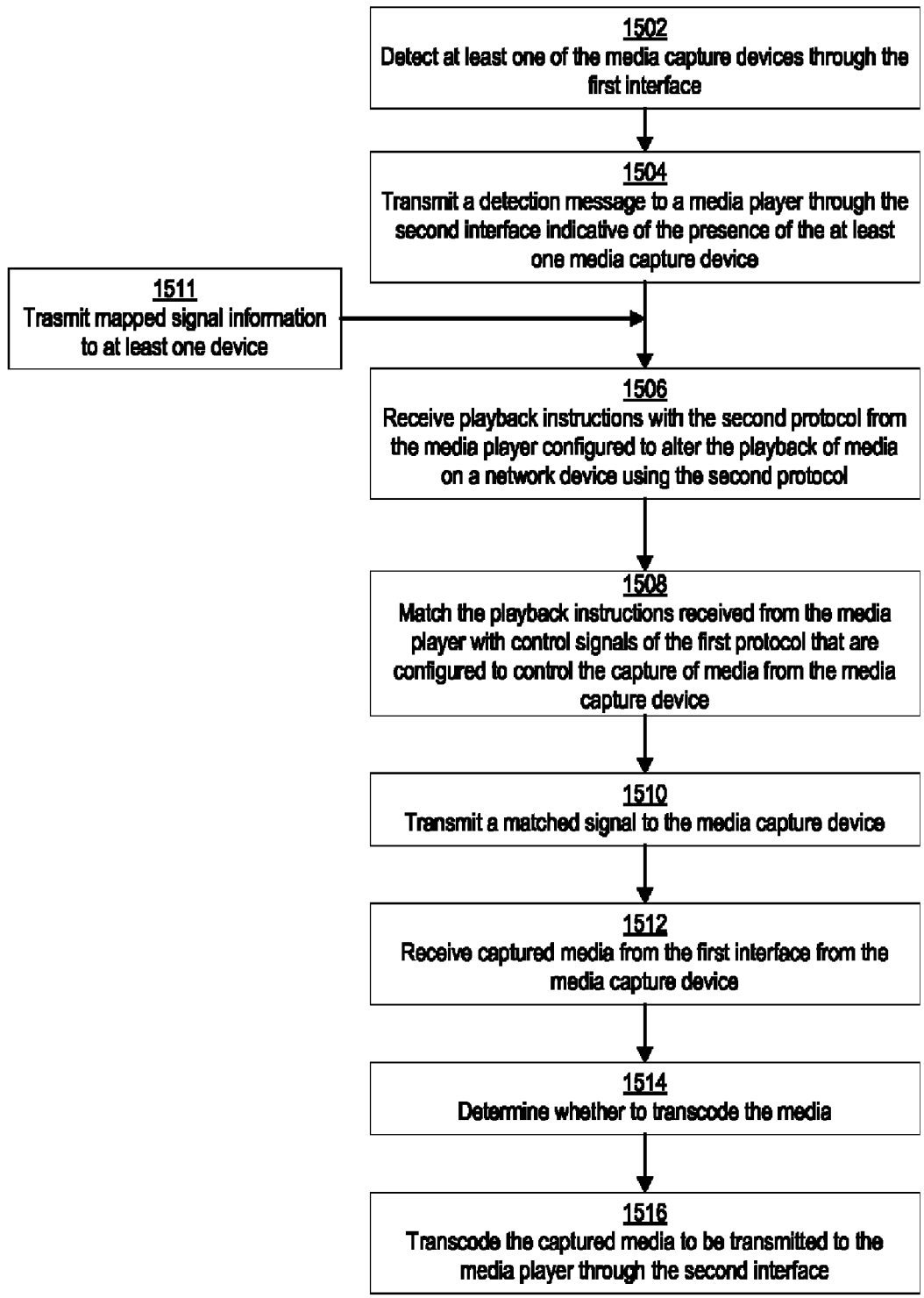
FIG. 15 is a flow diagram of an exemplary method in accordance with various aspects of the disclosure.

FIG. 15 is a flow diagram of an exemplary method that may be performed in accordance with one embodiment of the disclosure. In one embodiment, one or more processes or steps may be performed by network device 1400 shown in FIG. 14. In certain embodiments, one or more processes or steps may be initiated by computer-executable instructions located on computer-readable medium 1402 and executed by processor 1404. At step 1502, a network device, such as network device 1400 may detect the media capture device 1410 through the first interface 1406. In one embodiment, the media capture device 1410 comprises an IP-enabled webcam. In one embodiment, a Simple Service Discovery Protocol (SSDP) message may be utilized during the detection process of 1502. Those skilled in the art will readily appreciate that other mechanisms and/or protocols may be used in a detection process.

Step 1504 may transmit a detection message to a media player. Looking at FIG. 14 as an example, upon detection of the media capture device 1410, a detection message may be transmitted through the second interface 1408 of network device 1400 to the media player 1418. The detection message may be a multicast message comprising electronic signals indicative of the presence of the media capture device 1410.

In one embodiment, the detection message of process 1504 comprises a control URL and a service URL. In one embodiment, a media player, such as media player 1418 may control a media capture device, such as capture device 1410 through the control URL obtained in a detection process. In this regard, the network device 1400 may serve as a DLNA media server that may aggregate any streaming media from webcams within the network.

Thus, upon conclusion of step 1504, the network element 1400 may be operatively connected to a media capture device (i.e. 1410) that is controllable through a first protocol (such as IP) and a media player (i.e., 1418) that is not natively configured to communicate through the first protocol, but rather is configured to play media using a separate second protocol (i.e., DLNA/UPnP).

At process 1506, playback instructions utilizing the second protocol may be received from the media player 1418. The instructions, being under the second protocol, may be configured to alter the playback of media on a network device (such as network device 1400) using the second protocol, however, as received; they are not capable of controlling the media capture device 1410. The playback instructions may have originated or been derived from an input received at interface 1424 from a user-input device. Process 1508 may be implemented to match one or more control signals transmitted through the first protocol with playback signals of the second protocol. For example, process 1508 may be implemented to match playback instructions received from the media player 1418 to control signals of the first protocol configured to control the capture of media from the media capture device 1410. Table 1 shows exemplary matching of DLNA playback signals to control signals of an IP-enabled webcam, for example, that utilizes the IP protocol and not configured to utilize DLNA data.

TABLE 1

Exemplary Matching of DLNA Signals to UPnP Signals

| DLNA | IP |
|---|---|
| PLAY | CAPTURE MEDIA |
| REWIND | ZOOM OUT 25% |
| FAST FORWARD | ZOOM IN 15% |
| NEXT CHAPTER | TURN RIGHT |
| PREVIOUS CHAPTER | TURN LEFT |
| STOP | UP |
| PAUSE | DOWN |

As seen in Table 1, a DLNA signal configured to "play" media of a DLNA device may be matched to capture media from the media capture device 1410. Similarly, a DLNA signal configured to "rewind" DLNA-based media may be matched to cause the webcam to zoom out 25%. As seen in the remainder of Table 1, there are several DLNA signals that may be matched to various instructions to control the media capture device 1410. As would be understood by those skilled in the art with the benefit of this disclosure, Table 1 merely shows an exemplary matching of the signals to illustrate features of certain embodiments and other variations may be implemented without departing from the scope of the disclosure.

Matching signals of the first protocol with the signals of the second protocol may be previously determined. In one embodiment, the determination of what signals of the first protocol are mapped with the second protocol is determined before process 1508. The determination may utilize one or more factors, such as determining the playback capabilities of media player 1418 and/or the media capture device 1410. Indeed, in one embodiment of this disclosure, capabilities may be detected or determined upon the media capture device 1410 and/or media player 1418 being connected to interface 1406 or 1408, respectively. In further embodiments of this disclosure, certain signals may be defined by the manufacturer or user. In one embodiment disclosed herein, a user may provide values for matching signals through a graphical user interface.

Process 1511 may implemented in embodiments where signals of the first protocol have been predetermined, mapped or otherwise associated with the signals of the second protocol. In one embodiment, process 1511 may occur following 1504, yet in another embodiment, process 1511 may occur anytime before 1506. Process 1511 may transmit previously determined information regarding mapped signals to other electronic devices, including other media players, media capture devices, servers, and/or user input devices. Indeed, user input devices, which are often referred to as "remote controls" when referring to the control of audio visual media, may comprise assignable keys and/or be associated with a display device. For example, a button or other input mechanism on a user-input device may be in close proximity to certain text or graphics on a display device to indicate the action of the button. Likewise, a touch screen may allow a user to directly activate an action by pressing the touch screen.

In accordance with one embodiment of this disclosure, interface 1424 of media player 1418 may be configured to allow input from a user input device, such as a mouse, a keyboard, or remote control specific to an electronic device. The process may be implemented to assign an action of a user-input device with the matched signals. For example, a remote control for a user input device may have a button or key that, when used for transmitting signals for controlling an electronic device of a first protocol (i.e., for controlling a device configured to transmit and/or receive DLNA data using the DLNA protocol, hereinafter "DLNA device") controls the playback of media. For example, the button may be assigned to "rewind" media, and upon being activated, the received signal rewinds media of the DLNA device. The same rewind button or key (optionally with an associated display) may be configured to indicate that activating the button or key will cause a media capture device, 1410 to "zoom out 25%" (see Table 1, above). Thus, while the control signal received from the user input device is identical regardless whether the user is controlling the media player 1418 or the media capture device 1410, a notification may more readily convey the resulting action to an end user. The display associated with a specific button or key of a user-input device is not required to be located on the user input device. Rather, in one embodiment, a display device may be operatively coupled to the media player 1418, such as a television or monitor may provide an indication of its action.

Process 1510 may be implemented to transmit the matched control signals through the first interface 1406 to the media capture device 1410, thereby allowing control of the media capture device 1410. In one embodiment, a control URL obtained in a discovery message may be utilized to transmit the control signals. Unlike traditional methods that require the user to install or initiate a specific interface to control the media capture device 1410, certain embodiments allow existing devices within a consumer's network to control the media capture device 1410. For example, several commercially-available webcams require a user to install a user interface on a computer device, such as a PC, in which the user must load into memory as a prerequisite to control the capture device. Alternatively, the user may have to load a browser (such as an html browser) into memory, type in a specific IP address for the camera, and then manually control the camera. These approaches require a separate computer device or browser to be implemented, require a device (such as a PC) to be powered with an application to be loaded in memory, and/or are not user friendly. In contrast, disclosed embodiments allow unrelated electronic devices to control the media capture devices with signals configured to control the playback of media.

Process 1512 may receive captured media at the first interface 1406 from the media capture device 1410. Process 1514 may determine whether the media is to be transcoded. The determination whether to transcode media at 1514 may consider playback capabilities of the media player 1418. Those skilled in the art will appreciate that process 1514 may occur before process 1506. Indeed, in one embodiment, the playback capabilities may be detected or determined upon the media player 1418 being connected to interface 1408. In yet another embodiment, the determination or detection of the playback capabilities may be performed during or after process 1514. Indeed, capabilities of one or more devices on a given network may fluctuate over time. For example, high network traffic may affect the quality of any media travelling through the network. Moreover, users may determine to conserve bandwidth by reducing the quality of at least a subset of media received at media player 1418.

Process 1516 may be implemented to transcode the captured media to be transmitted to the media player 1418 through the second interface 1408. In one embodiment, process 1516 may be performed a by a transcoder module. Those skilled in the art will appreciate that transcoding of media may be hardware-based, software-based or combinations thereof. Therefore, in certain embodiments, a transcoder module may be implemented using processor 1402, computer-readable medium 1404, and/or combinations thereof. Yet, in other embodiments, another processor and/or computer-readable medium may be implemented to serve as a transcoder module. Any transcoding module(s) may transcode media so that IP media content (such as content from a webcam) may be delivered as a DLNA asset through one or more network devices, such as media player 1418.

Process 1516 may convert the format of a media file or streamed file format, such as from a webcam, into an appropriate format so that a target device (i.e., the media player 1418) may properly play the converted media file based on characteristics of the target device (e.g., resolution and color display capability). In this regard, process 1516 may convert video formats (i.e., MPEG-2 to MPEG-4, VHS to Quick-Time, QuickTime to MPEG). Moreover, HTML files and graphics files may be configured to comply with the unique constraints of mobile devices and other Web-enabled products. For example, mobile devices often have smaller screen sizes, lower memory, and slower bandwidth rates. Transcoding may entail (changing file formats as previously discussed), transrating (lowering the screen resolution or frames per second to meet the capabilities of the player), re-encrypting content, and combinations thereof.

Figure 16:
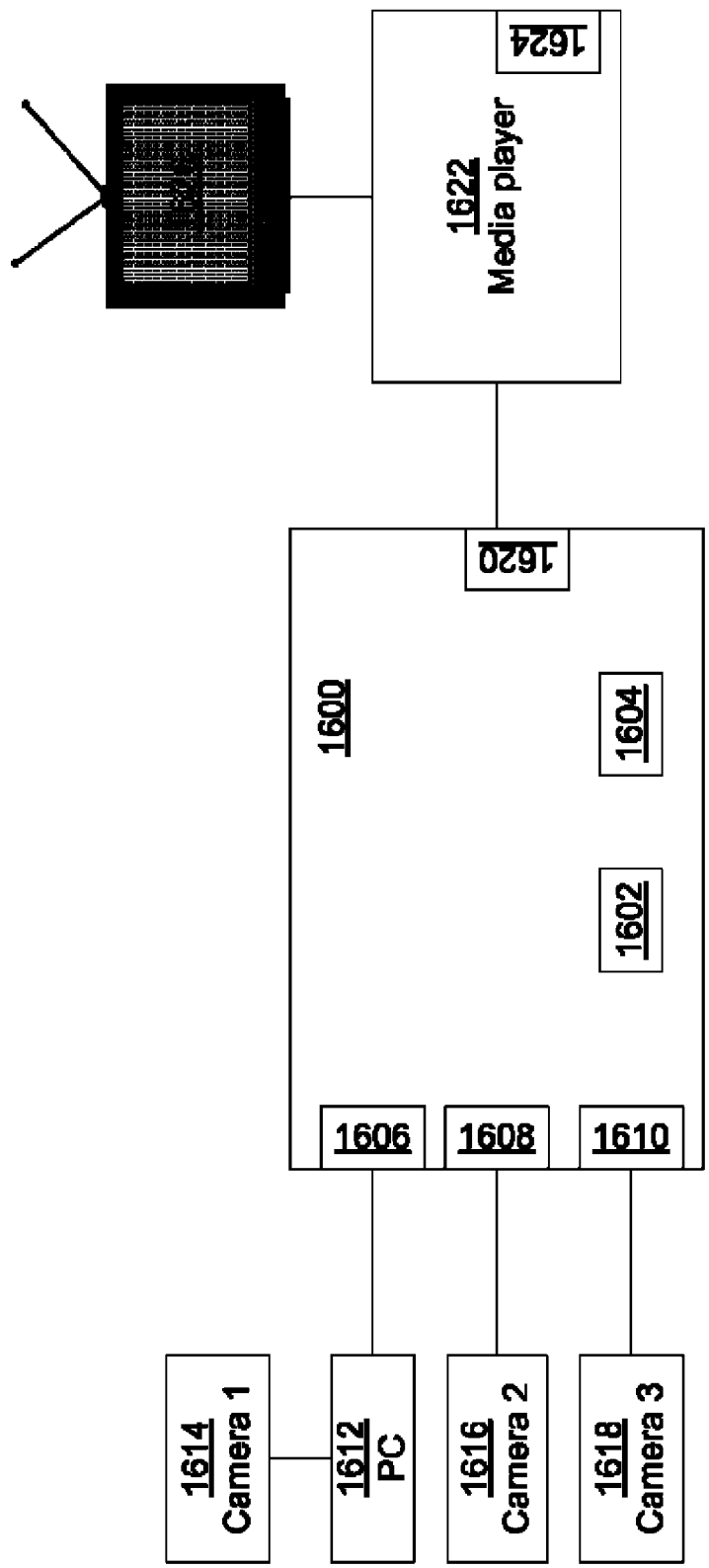
FIG. 16 is an exemplary network environment having a plurality of media capture devices in accordance with various aspects of the disclosure.

Aspects of this disclosure are directed towards utilizing a plurality of media capture devices as a security platform. As discussed above, several prior art media capture devices, such as webcams, require end users to assign each webcam a unique address. Moreover, many cameras require that the user enter a different web address into a browser or application to access each different webcam. Furthermore, existing user input devices, such as remote controls for DLNA media players, may not be used to control the webcams. FIG. 16 shows an exemplary embodiment having a plurality of media capture devices arranged to create a security platform. Network device 1600 may be substantially similar to network device 1400 and comprises processor 1602 and computer readable medium 1604.

As seen in FIG. 16, network device comprises interfaces 1606, 1608, 1610 for connecting to media capture devices, such as webcams. Specifically, interface 1606 operatively connects PC 1612 to network device 1600. PC 1612 includes camera 1 (denoted with element 1614). Likewise, interface 1608 directly connects camera 2 (element 1616) to the network device 1600. Lastly, interface 1610 wirelessly connects camera 3 (element 1618) to the network device 1600. Thus, each camera 1614, 1616, 1618 connects through a different interface and may utilize a different protocol to natively control the camera 1614, 1616, 1618. There, however, is not a requirement that any of media capture devices 1614, 1616, 1618 utilize a different protocol from each other, however, at least one of the media capture devices uses a protocol that is distinct from the protocol of media player 1622. Media player 1622 may comprise interface 1624 to communicate with a user input device (not shown). Media player 1622 may be operatively connected to a display device, such as display 1626.

Figure 17:
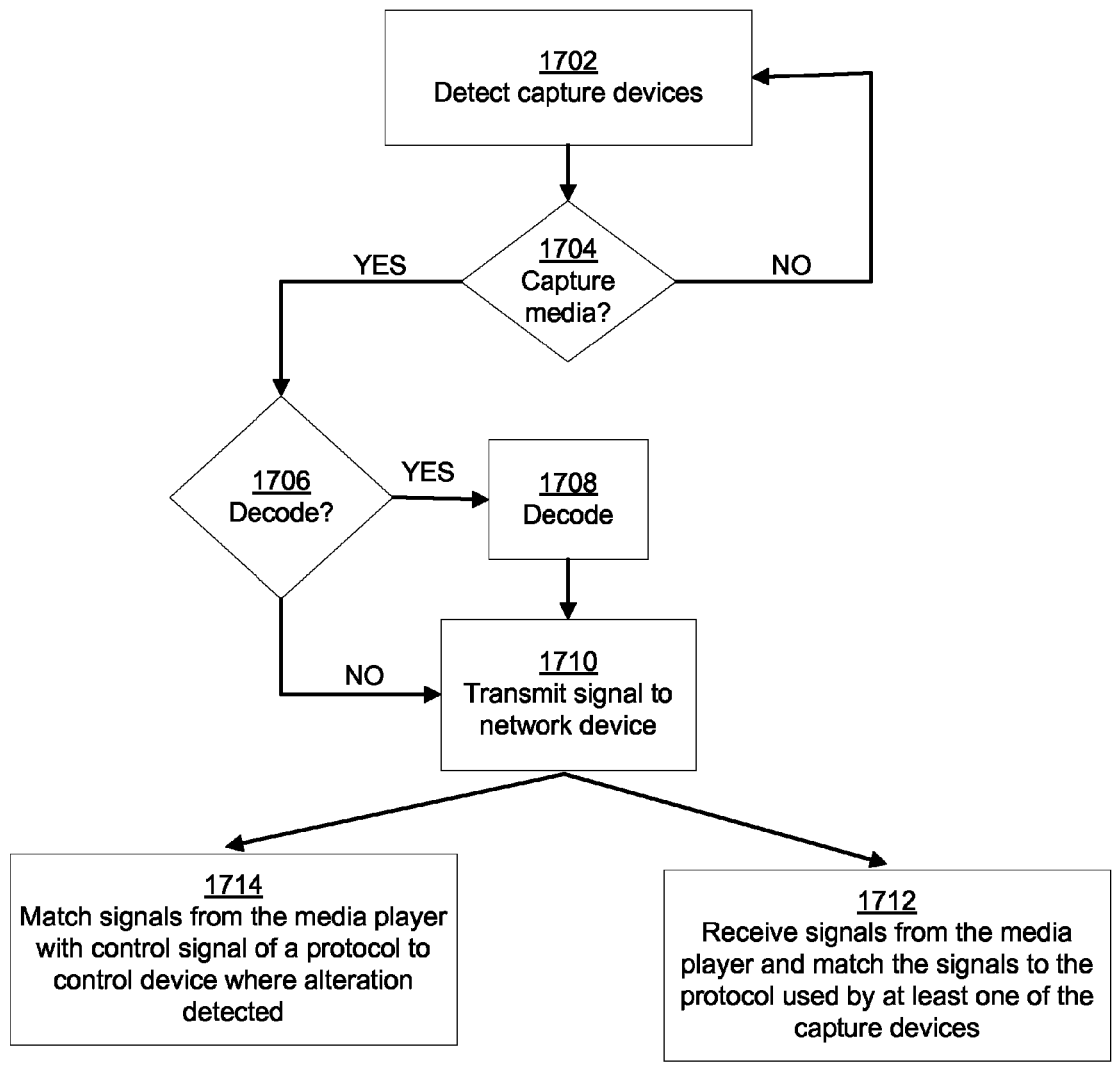
FIG. 17 is a flow diagram of an exemplary method in accordance with various aspects of the disclosure.

FIG. 17 shows a flow diagram of an exemplary method that may be used to capture media in a networking environment, such as that shown in FIG. 16, in accordance with one embodiment of the disclosure. In one embodiment, implementing one or more steps shown in FIG. 17 may be utilized to create a security platform. Process 1702 may detect one or more of the media capture devices 1614, 1616, and/or 1618 and may be conducted on a routine schedule, on command, and/or upon detection of a new device within the network. The detection of the media capture devices 1614, 1616, and/ or 1618, may be performed similarly to the processes discussed above.

Process 1704 may be implemented to determine whether to capture media from one or more of the webcams 1614, 1616, 1618 (which may use a first control protocol, i.e. IP). The captured media may be received at network device 1600, either individually or simultaneously. The determination to capture media may consider one or more factors. For example, media may be captured from a specific webcam upon detection of an altered environmental condition, such as motion, lighting, temperature, noise, etc. In another embodiment, signals comprising playback instructions for the media player 1622 using a second control protocol may be received through interface 1624 from a user input device. In one embodiment, processes 1706 and/or 1708 may be implemented to decode media captured from one or more of the webcams 1614, 1616, 1618. Transcoding may be performed according to those processes known to those skilled in the art and/or as previously described above. Process 1710 may transmit any signals, such as an indication of an altered environmental condition being detected by one or more cameras or device associated with one of the cameras 1614, 1616, 1618.

The playback instructions may be transmitted from the media player 1622 and received at the network device 1600. At process 1712, the playback instructions received from the media player 1622 may be matched to control signals of the first protocol configured to control the capture of media from at least one of media capture devices 1614, 1616, 1618. In one embodiment, control signals are matched similar to the values provided in Table 1, above. Each device, regardless of what protocol being used, may have its own matched control signals. For example, camera 1 (element 1614) may be a 3-megapixel camera, while camera 2 may be a 1-megapixel camera, therefore, a control signal that instructs camera 1 (1614) to zoom in 25% may be assigned to instruct camera 2 (1616) to zoom in only 15%.

A user input may not required to capture of media from one or more of the media capture devices 1614, 1616, 1618. Indeed, a control signal to capture media may be transmitted upon reception of a signal from one of the capture devices 1614, 1616, 1618 that an environmental condition (i.e., motion, lighting, temperature, noise, etc.) has been altered. In one embodiment, detection of a change in environmental conditions may initiate a signal to be transmitted to the network device 1600. In one embodiment, the signal may be captured media, yet in other embodiments, the signal may determine if media should be transcoded, such as described above. In further embodiments, process 1714 may be implemented, wherein the signal may encode instructions that ensure any signals captured from a user input device are matched with signals to control the media capture device 1614, 1616, 1618 where the altered environmental condition was detected. Playback instructions using the second protocol may be received from the media player 1622 (see e.g., process 1506 of FIG. 15). The playback instructions may be matched and transmitted to the media capture devices 1614, 1616, 1618 as appropriate. (see e.g. processes 1508 and 1510). In one embodiment, instructions from the media player 1622 may designate which media capture device 1614, 1616, 1618 to control, yet in another embodiment, the device may be preselected (which may then be changed by further instructions).

While the exemplary embodiments have been discussed in broad terms of a cable communications networking environment, some embodiments may be configured for other networking environments including telecommunications environments.

We claim:

1. A network device comprising:
   a first interface configured to communicate with at least one controllable media capture device that is controllable through a first protocol;
   a second interface configured to communicate with at least one media player through a second protocol;
   a processor;
   a non-transitory computer-readable medium comprising computer-executable instructions that when executed by the processor perform a method comprising:
   detecting at least one of the controllable media capture devices through the first interface;
   transmitting a detection message to at least one media player through the second interface indicative of the presence of the at least one controllable media capture device;
   receiving playback instructions through the second interface using the second protocol from the media player; and
   processing the playback instructions received from the media player to determine control signals for controlling capture of media from the controllable media capture device.

2. The device of claim 1, wherein the computer-executable instructions further comprise:
   receiving captured media from the first interface from the media capture device; and
   determining whether to transcode the captured media.

3. The device of claim 2, the instructions further comprising:
   transcoding the captured media to be transmitted to the media player through the second interface, and
   wherein determining whether to transcode the captured media comprises a process selected from the group consisting of: determining the capabilities of the media player; determining the presence of predefined rules, and combinations thereof.

4. The device of claim 2, wherein the controllable media capture device is an audio-visual capture device.

5. The device of claim 2, wherein the first protocol comprises the Internet Protocol (IP).

6. The device of claim 2, wherein the second protocol comprises a protocol selected from at least one of: Digital Living Network Alliance (DLNA) protocol, Universal Plug and Play (UPnP), and combinations thereof.

7. The device of claim 6, wherein detecting at least one of the controllable media capture devices through the first interface comprises the detection of a Simple Service Discovery Protocol (SSDP) message.

8. The device of claim 2, wherein the detection message transmitted to at least one media player is a multicast message.

9. The device of claim 8, wherein the detection message comprises control URL and a service URL.

10. The device of claim 1, wherein the computer-readable medium further comprises computer-executable instructions that when executed by the processor perform a method comprising:
    displaying on a display device associated with a user input device configured to transmit a user input to the media player and display, an indication of an action for controlling a controllable media capture device.

11. The device of claim 10, wherein the display device associated with the user input device is located on the user input device.

12. The device of claim 10, wherein at least one of the controllable media capture devices is a webcam.

13. A network device comprising:
    a first interface configured to communicate with at least one controllable media capture device that is controllable through a first protocol;
    a second interface configured to communicate with at least one media player through a second protocol;
    a third interface configured to communicate with at least one controllable media capture device that is controllable through a third protocol;
    a processor; and
    a non-transitory computer-readable medium comprising computer-executable instructions that when executed by the processor performs a method comprising:
    determining to capture media from at least one controllable media capture device; and
    processing playback instructions received from the media player using the second protocol to determine control signals for controlling capture of media from a controllable media capture device in operative communication with either the first interface or the third interface, wherein the control signals are configured to cause the controllable media capture device to perform at least one of: zoom in, zoom out, pan or a combination thereof.

14. The device of claim 13, wherein determining to capture media from at least one controllable media capture device is based upon, at least in part, on detecting an alteration of an environmental condition.

15. The device of claim 13, wherein an alteration of an environmental condition is detected by a controllable media capture device operatively connected to the first interface, and wherein the playback instructions received from the media player to control signals of the capture device where the environmental condition was detected.

16. The device of claim 13, wherein the first protocol comprises the Internet Protocol (IP).

17. The device of claim 13, wherein the second protocol comprises a protocol selected from at least one of: Digital Living Network Alliance (DLNA) protocol, Universal Plug and Play (UPnP), and combinations thereof.

18. The device of claim 13, wherein determining to capture media from at least one controllable media capture device is based upon receiving playback instructions from a user input device through the media player.

19. A computer-implemented method comprising:
receiving playback instructions from a media player using a first control protocol;
associating the playback instructions received from the media player to control signals configured to be transmitted using a second protocol configured to control capture of media from a controllable media capture device; and
transmitting a signal to the controllable media capture device operating under a second control protocol to capture media comprising Internet Protocol (IP)-based content.

20. The method of claim 19, further comprising:
receiving captured media from the controllable media capture device; and
transcoding the captured media to be transmitted to the media player.

* * * * *

UNITED STATES PATENT AND TRADEMARK OFFICE
CERTIFICATE OF CORRECTION

PATENT NO. : 8,379,668 B2  
APPLICATION NO. : 12/691485  
DATED : February 19, 2013  
INVENTOR(S) : James S. Poder et al.

Page 1 of 1

It is certified that error appears in the above-identified patent and that said Letters Patent is hereby corrected as shown below:

In the Specification

Column 5, Line 63:
 After "DMS", please insert --discovery--

Column 7, Line 34:
 Delete "180" and insert --108--

Column 9, Line 40:
 Delete "303," and insert --305,--

Column 9, Line 45:
 After "local", insert --network--

Column 10, Line 20:
 Delete "media" and insert --network--

Signed and Sealed this
Twenty-ninth Day of September, 2015

Michelle K. Lee
*Director of the United States Patent and Trademark Office*